United States Patent
Morgan et al.

(10) Patent No.: US 12,140,089 B2
(45) Date of Patent: Nov. 12, 2024

(54) GAS TURBINE ENGINE SYSTEM WITH GENERATOR

(71) Applicant: Rolls-Royce North American Technologies, Inc., Indianapolis, IN (US)

(72) Inventors: Sean Andrew Morgan, Indianapolis, IN (US); Timothy Unton, Indianapolis, IN (US); Alan W. Smith, Indianapolis, IN (US); Adam Lagrange, Indianapolis, IN (US); James Christopher Muskat, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 259 days.

(21) Appl. No.: 17/562,540

(22) Filed: Dec. 27, 2021

(65) Prior Publication Data

US 2023/0203995 A1    Jun. 29, 2023

(51) Int. Cl.
*F02C 9/48*      (2006.01)
*F02C 6/00*      (2006.01)
*H02K 7/18*      (2006.01)

(52) U.S. Cl.
CPC .............. *F02C 9/48* (2013.01); *F02C 6/00* (2013.01); *H02K 7/1823* (2013.01);
(Continued)

(58) Field of Classification Search
CPC ..... F02C 9/48; F02C 6/00; F02C 6/20; H02K 7/1823; F05D 2220/32; F05D 2220/76; F05D 2270/06; F05D 2270/101
(Continued)

(56) References Cited

U.S. PATENT DOCUMENTS

| 4,841,216 A | 6/1989 | Okada et al. |
| 5,075,616 A | 12/1991 | Mitsui |

(Continued)

FOREIGN PATENT DOCUMENTS

WO    2018/211227 A1    11/2018

OTHER PUBLICATIONS

Bozhko et al., "Development of Aircraft Electric Starter-Generator System Based-On Active Rectification Technology," IEEE Transactions on Transportation Electrification, Aug. 3, 2018, 14 pp.
(Continued)

*Primary Examiner* — Charles Reid, Jr.
(74) *Attorney, Agent, or Firm* — Shumaker & Sieffert, P.A.

(57) ABSTRACT

In some examples, a system including a gas turbine engine, the engine including a high-pressure (HP) shaft; HP compressor; HP turbine, second shaft; second compressor; second turbine, the second turbine being coupled to the second compressor via the second shaft (e.g., LP shaft); and a generator coupled to the LP shaft. The generator is configured to generate electrical power from rotation of the LP shaft, and increase electrical power generated by the generator to increase a torque applied to the LP shaft by the generator, e.g., in combination with reduction in engine thrust, or in response to the detection of a stall and/or surge of the engine. The increase in torque applied to the second shaft is configured to increase a rate at which a rotational speed of the second shaft decreases, e.g., in combination with the reduction in engine thrust or during the stall/surge of the engine.

20 Claims, 10 Drawing Sheets

(52) U.S. Cl.
CPC ...... *F05D 2220/32* (2013.01); *F05D 2220/76* (2013.01); *F05D 2270/06* (2013.01); *F05D 2270/101* (2013.01)

(58) Field of Classification Search
USPC .......................................................... 290/52
See application file for complete search history.

(56) References Cited

U.S. PATENT DOCUMENTS

| | | | |
|---|---|---|---|
| 5,301,500 | A | 4/1994 | Hines |
| 5,694,765 | A | 12/1997 | Hield et al. |
| 6,931,856 | B2 | 8/2005 | Belokon et al. |
| 7,253,535 | B2 | 8/2007 | Duesterhoeft |
| 7,882,691 | B2 | 2/2011 | Lemmers, Jr. et al. |
| 8,475,990 | B2 | 7/2013 | Shishido |
| 8,584,464 | B2 | 11/2013 | Joshi et al. |
| 8,776,530 | B2 | 7/2014 | Shirooni et al. |
| 8,935,924 | B2 | 1/2015 | Takeda et al. |
| 9,045,996 | B2 | 6/2015 | Anghel et al. |
| 10,263,550 | B2 | 4/2019 | Thet et al. |
| 10,429,154 | B2 | 10/2019 | Munevar |
| 10,583,931 | B2 * | 3/2020 | Cline ........................ F02C 6/14 |
| 10,676,199 | B2 | 6/2020 | Hon et al. |
| 2008/0148881 | A1 | 6/2008 | Moniz et al. |
| 2008/0276620 | A1 | 11/2008 | Ullyott et al. |
| 2010/0065374 | A1 | 3/2010 | Szolomayer et al. |
| 2016/0319837 | A1 * | 11/2016 | Morris .................. F04D 29/362 |
| 2017/0334377 | A1 | 11/2017 | Klemen et al. |
| 2017/0335710 | A1 | 11/2017 | Klemen et al. |
| 2017/0335713 | A1 | 11/2017 | Klemen et al. |
| 2017/0335795 | A1 | 11/2017 | Klemen et al. |
| 2018/0245512 | A1 * | 8/2018 | Brostmeyer ............... F02C 3/04 |
| 2019/0264615 | A1 | 8/2019 | Husband et al. |
| 2021/0010384 | A1 | 1/2021 | Bradley |
| 2023/0045973 | A1 | 2/2023 | Morgan et al. |
| 2023/0203989 | A1 | 6/2023 | Morgan et al. |

OTHER PUBLICATIONS

"Starter Generator," Retrieved from https://meggittpower.com/product/starter-generator/ on Apr. 8, 2021, 3 pp.
Largue, "GE Completes First Battery-Assisted Black Start of Heavy Duty GasTurbine," https://www.powerengineeringint.com/gas-oil-fired/ge-completes-first-battery-assisted-black-start-of-a-heavy-duty-ge-gas-turbine/, Feb. 27, 2020, 2 pp.
Office Action from U.S. Appl. No. 17/562,571 dated Nov. 21, 2023, 26 pp.
Advisory Action from U.S. Appl. No. 17/562,571 dated May 24, 2024, 3 pp.
Final Office Action from U.S. Appl. No. 17/562,571 dated Mar. 1, 2024, 26 pp.
Response to Office Action dated Nov. 21, 2023 from U.S. Appl. No. 17/562,571, filed Feb. 21, 2024, 19 pp.
Response to Final Office Action dated Mar. 1, 2024 from U.S. Appl. No. 17/562,571, filed May 1, 2024, 12 pp.
Response to Final Office Action dated Mar. 1, 2024 from U.S. Appl. No. 17/562,571, filed Jun. 3, 2024, 12 pp.

* cited by examiner

GAS TURBINE ENGINE SYSTEM WITH GENERATOR

TECHNICAL FIELD

The present disclosure relates to gas turbine engine systems that are used, in some examples, for powered vehicles, such as aircraft.

BACKGROUND

A gas turbine engine is a type of internal combustion engine that may be used to power an aircraft, or another moving vehicle. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive a propulsor, and the propulsor may use the energy from the rotating shaft to provide propulsion for the system.

Gas turbine engine powered vehicles, such as aircraft, increasingly use electrical systems which may operate to provide auxiliary functions beyond vehicle propulsion. Electrical systems may be used to replace mechanical, hydraulic, and pneumatic drive systems in gas turbine engine powered vehicles. Gas turbine engine powered vehicles may include electrical energy generating systems to supply power for the electrical systems.

SUMMARY

The present disclosure is directed to gas turbine engine systems including multiple spools and techniques for operating the same. Examples of the gas turbine engine systems may include a high-pressure (HP) spool and at least one other lower-pressure (LP) spool (e.g., a low-pressure spool and/or an intermediate pressure spool). The gas turbine engine may include a generator coupled to the shaft of the LP spool. The generator may be configured to generate power from the rotation of the LP shaft of the LP spool during operation of the turbine engine when the LP shaft is driven by a turbine of the LP spool.

During operation of the turbine engine, the generator may be controlled to apply a tailored level of torque to the LP shaft, e.g., by adjusting the level of power generated by the generator. For example, in combination with a reduction in thrust and/or deceleration by the turbine engine, the amount of power generated by the generator may be increased (e.g., by temporarily applying a load or increasing the electrical load applied on the generator) to increase the torque applied to the LP shaft by the generator. As another example, in response to a detected stall or surge of the gas turbine engine, the amount of power generated by the generator may be increased (e.g., by temporarily applying a load or increasing the load applied on the generator) to increase the torque applied to the LP shaft by the generator. The adjustments to the torque applied by the generator to the LP shaft may improve the operation of the gas turbine engine, e.g., for those reasons described below.

In some examples, the present disclosure is directed to a gas turbine engine system comprising a gas turbine engine, the gas turbine engine comprising: a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; a generator coupled to the second shaft, wherein the generator is configured to generate electrical power from a rotation of the second shaft, and increase the electrical power generated by the generator to increase a torque applied to the second shaft by the generator in combination with a reduction in engine thrust.

In some examples, the present disclosure is directed to a method for operating a system including a gas turbine engine, the gas turbine engine comprising a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; and a generator coupled to the second shaft, the method comprising: generating, using the generator, electrical power from a rotation of the second shaft, and increasing the electrical power generated by the generator to increase a torque applied to the second shaft by the generator in combination with a reduction in engine thrust.

In some examples, the present disclosure is directed to a system comprising a gas turbine engine, the gas turbine engine comprising: a high-pressure (HP) shaft; a HP compressor; a HP turbine, the HP turbine coupled to the HP compressor via the HP shaft; a fan; a second shaft; a second turbine, the second turbine being coupled to the fan via the second shaft; and a generator coupled to the second shaft, wherein the generator is configured to generate electrical power from a rotation of the second shaft, and increase the electrical power generated by the generator to increase a torque applied to the second shaft by the generator in combination with a reduction in engine thrust.

In some examples, the present disclosure is directed to a system comprising a gas turbine engine, the gas turbine engine comprising: a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; a generator coupled to the second shaft, wherein the generator is configured to generate electrical power from a rotation of the second shaft, and wherein the generator is configured to, in response to at least one of a stall or a surge of the gas turbine engine, increase the electrical power generated by the generator to increase a torque applied to the second shaft by the generator during the at least one of the stall or the surge of the gas turbine engine.

In some examples, the present disclosure is directed to a method for operating a system including a gas turbine engine, the gas turbine engine comprising a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; and a generator coupled to the second shaft, the method comprising: generating, using the generator, electrical power from a rotation of the second shaft; detecting at least one of a stall or a surge of the gas turbine engine; and increasing, in response to the detected at least one of the stall or the surge of the gas turbine engine, the electrical power generated by the generator to increase a torque applied to the second shaft by the generator during the at least one of the stall or the surge of the gas turbine engine.

The details of one or more examples are set forth in the accompanying drawings and the description below. Other features, objects, and advantages will be apparent from the description and drawings, and from the claims.

DETAILED DESCRIPTION

Figure 1:
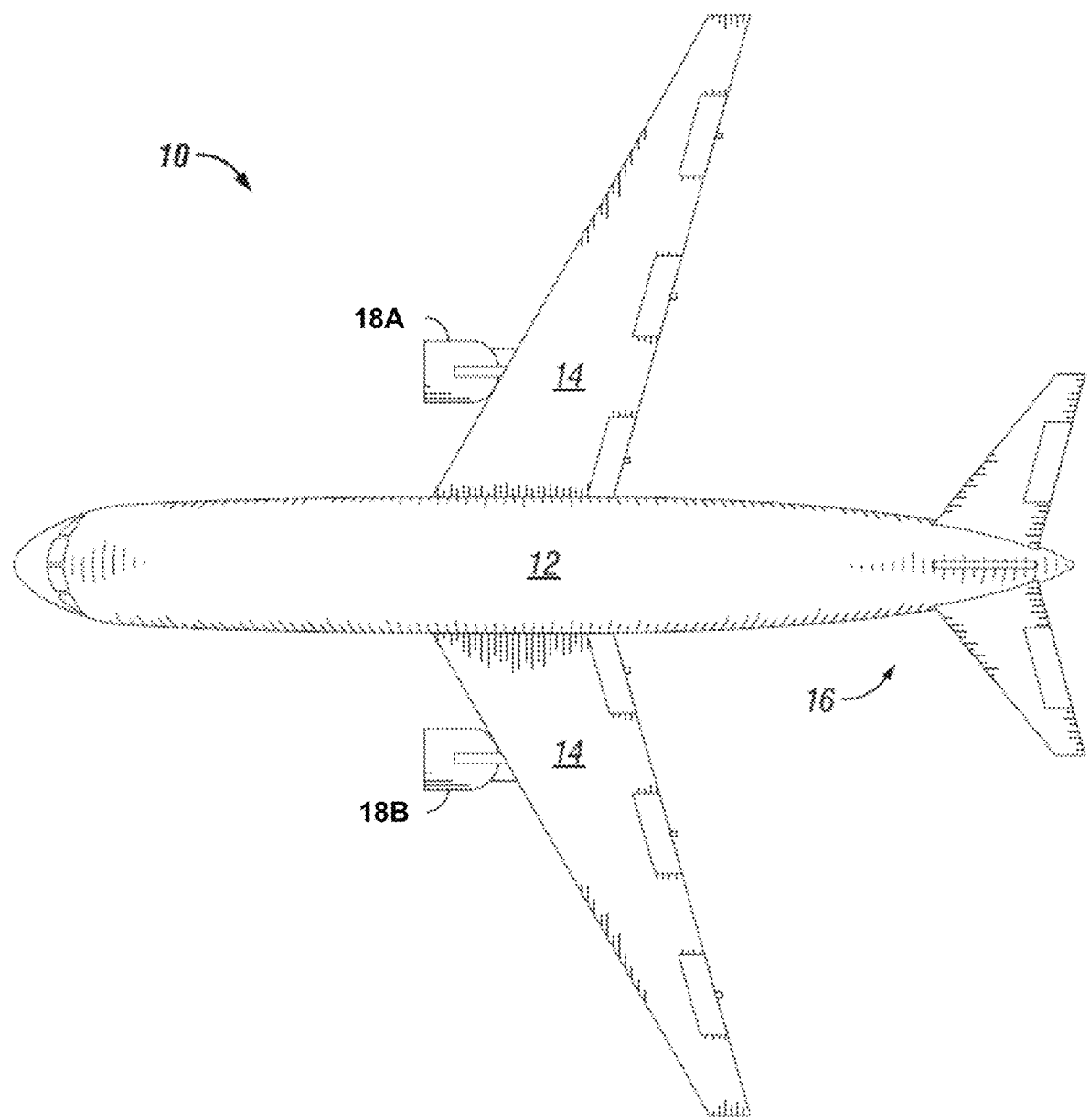
FIG. 1 is a conceptual diagram illustrating an example vehicle in accordance with an example of the present disclosure.

The present disclosure is directed to gas turbine engine systems, e.g., for gas turbine engine powered vehicles such an aircraft, and techniques for operating the same. For ease of description, examples of the disclosure will be primarily described in the context of aircraft as a gas turbine engine powered vehicle. However, examples of the disclosure are not limited to aircraft.

Gas turbine engine powered aircraft increasingly require significant amount of additional power beyond that generated by the one or more gas turbine engines used by the aircraft for main propulsion. In some examples, electrical systems may be used to replace mechanical, hydraulic, and pneumatic drive systems in gas turbine engine powered vehicles, while also providing one or more auxiliary functions to the aircraft not directly related to propulsion. Those electrical systems may increase the electrical load requirements for the vehicle.

Electric machines that function as electric generators may be employed by gas turbine combustion engine power aircraft to satisfy the transient and/or continuous electrical loads associated with the electrical system(s). For example, a gas turbine engine having a low-pressure spool assembly (e.g., including a low-pressure compressor and/or fan and a low-pressure turbine connected by a low-pressure shaft) and high-pressure spool assembly (e.g., including a HP pressure compressor and a HP turbine connected by a HP shaft) may include an electric generator that generates electricity from the rotation of the low-pressure spool shaft. The electrical power extracted from the low-pressure spool shaft may be used to supply power to various aircraft systems (e.g., electrical systems of the vehicle system that require electrical energy to operate, such as aircraft anti-ice heating, weapon systems, navigation systems including radar, environmental cooling systems (ECS)).

The present disclosure is directed to gas turbine engine systems including multiple spool assemblies and techniques for operating the same. Examples of the gas turbine engine systems may include a high-pressure (HP) spool assembly and at least one other lower pressure (LP) spool assembly (e.g., a low-pressure spool assembly and/or an intermediate pressure spool assembly). The gas turbine engine may include a generator coupled to the LP shaft of the LP spool assembly so that the generator generates power from the rotation of the LP shaft.

When the generator generates power from the rotation of the LP shaft, the generator applies an amount of torque on the LP shaft, e.g., a torque that acts to resist the rotation of the LP shaft. As described herein, the amount of torque applied by the generator may be modulated or otherwise adjusted during the operation of the gas turbine engine, e.g., when the gas turbine engine is providing propulsion for an aircraft. For example, the amount of torque applied by the generator to the LP shaft (e.g., in opposition to the rotation of the LP shaft) may be adjusted by adjusting the level of power generated by the generator. When the amount of power generated by the generator is increased, the amount of torque applied to the LP shaft may also increase. Similarly, when the amount of power generated by the generator is decreased, the amount of torque applied to the LP shaft may also decrease.

Examples of the present disclosure may adjust (e.g., dynamically) the amount of torque applied by the generator on the LP shaft during the operation of a gas turbine engine to provide for improved operation of the gas turbine engine. For example, in some instances, the amount of torque applied to the LP shaft by the generator may be increased in combination with a reduction in thrust by a gas turbine engine (e.g., for deceleration of the aircraft) by increasing the power generated by the generator from the LP shaft rotation for a period of time. The increase in power generated by the generator may be accomplished by increasing an electrical load for the generator, e.g., by an energy storage device to charge a battery and/or by electrical systems of the aircraft that may otherwise be supplied with power from another power source other than the generator.

As will be described below, in some examples the increase in torque applied by the generator to the LP shaft may decrease the deviation from a working line compared to the deviation that may normally result during the initial deceleration of an aircraft without such an increase in torque applied to the LP shaft. In some examples, the increase in torque applied by the generator to the LP shaft may increases the rate at which a rotational speed of the LP shaft decreases during the reduction in the engine thrust. In some examples, the increase in torque applied to the LP shaft is configured to reduce a time period over which the rotational speed of the LP shaft decreases during the reduction in engine thrust. In some examples, the increase in torque applied to the LP shaft is configured to decrease the transient deviation of the LP compressor from the working line of the LP compressor during the reduction in engine thrust. In each instance, the increase in torque applied to the LP shaft may be configured to prevent stall or surge of the LP compressor due to the HP compressor decelerating faster than the LP compressor.

Additionally, or alternatively, in some examples, the amount of torque applied to the LP shaft by the generator may be increased in combination with a stall or surge of a gas turbine engine by increasing the power generated by the generator from the LP shaft rotation for a period of time. As described below, the increased amount of torque during the stall or surge may cause the LP rotor(s) (e.g., low-pressure compressor, fan, and/or intermediate-pressure compressor) to reduce speed while the HP spool remains at a relatively high-speed demanding higher flow. This may cause a reduction, e.g., in the low-pressure compressor, fan, and/or IP compressor working line and allow the engine to recover from a stall or surge.

As noted above, some examples of the present disclosure relate to gas turbine engine that include an HP spool assembly and one or more lower-pressure spool assemblies (e.g., such as a low-pressure spool assembly or intermediate spool assembly). For ease of illustration, examples of the disclosure are described primarily with regard to dual spool gas turbine engines including a HP spool assembly, a low-pressure spool assembly (e.g., including a low-pressure fan and/or a low-pressure compressor), and a generator that generates power from rotation of the low-pressure shaft. However, the techniques described herein may also be applied to intermediate-pressure spool assemblies with such a generator in addition to, or as an alternative to, the low-pressure spool assemblies.

Figure 3A:
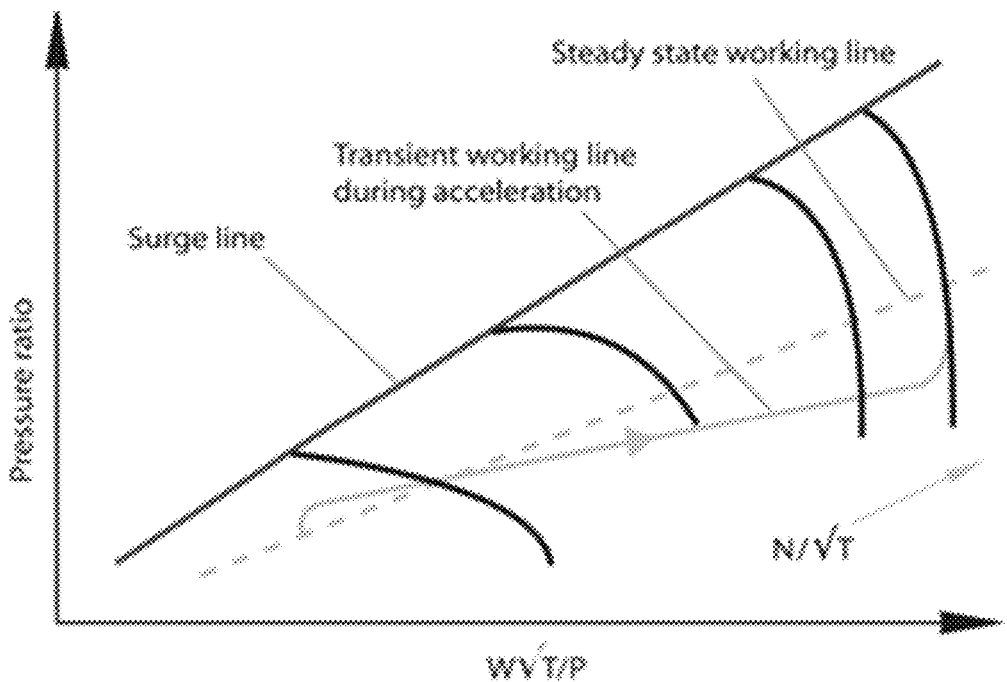
FIGS. 3A and 3B are example plots of compressor transient operating line plots showing corrected air flow versus pressure ratio for a low-pressure compressor or intermediate-pressure compressor of a gas turbine engine during acceleration and deceleration, respectively.
Figure 3B:
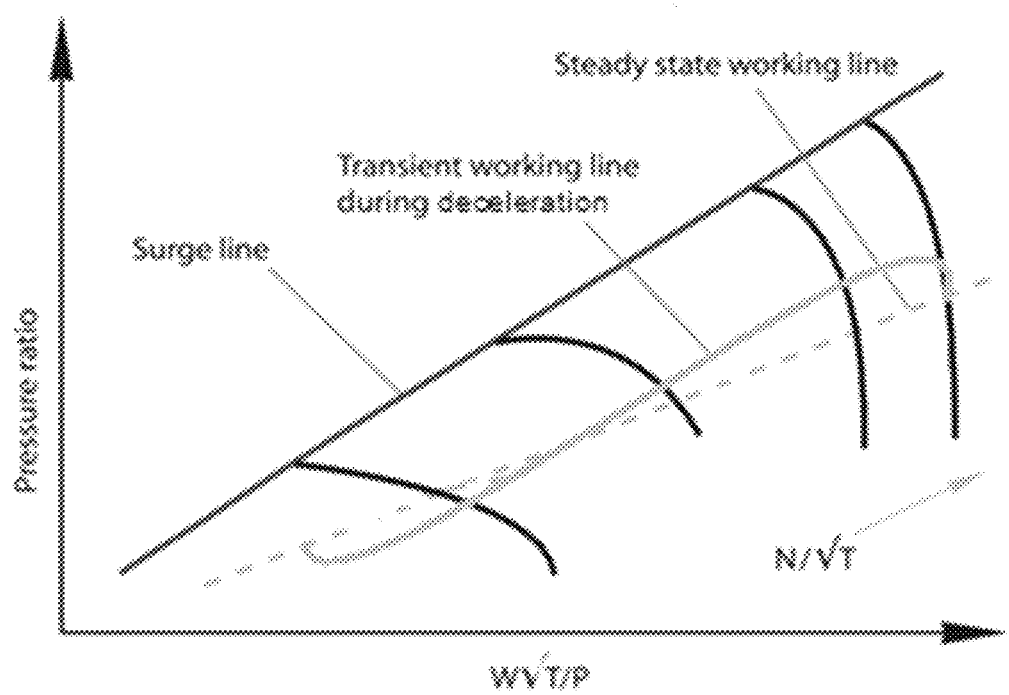

With reference to FIGS. 3A and 3B, the working line characteristic of an LP compressor for an example dual spool assembly gas turbine engine is shown in FIG. 3A for the acceleration of such a gas turbine engine. Initially, the LP compressor shows a small increase in its working line to satisfy the reduced mass flow into the HP compressor, but as soon as the HP spool begins to speed up the LP spool lags behind and so it drags the working line down, increasing the stall/surge margin. During a deceleration the opposite characteristic holds, characterized by an initial decrease in stall/surge margin as shown in FIG. 3B. The plots of FIGS. 3A and 3B may also be representative of an intermediate-pressure compressor. In FIGS. 3A and 3B, the pressure ratio on the vertical axis is the pressure ratio across the LP compressor (or intermediate pressure compressor or fan). The horizontal axis represents a compressor flow function which is proportional to compressor corrected flow. W is compressor physical flow. T is compressor inlet temperature and P is compressor inlet pressure. For corrected flow: W*SQRT(Theta)/Delta; Theta=T/standard temperature; and Delta=P/standard pressure When the LP compressor (e.g., low-pressure compressor and/or intermediate-pressure compressor) enters into a stall or surge, the stresses on the blades can increase substantially and additionally significant thrust can be lost. Therefore, during design of an engine, all the factors that influence stall margin must be accounted for such that positive margin is maintained throughout the life of the gas turbine engine. The accounting of items includes things such as increases in tip clearance due to rub-in (which will lower the stall line), manufacturing variability (which can affect both the stall and working line), as well as engine transients as just discussed. If it is possible to reduce the amount of stall margin that must be maintained in design, for example through improved manufacturing tolerances (or, e.g., example techniques described herein), then the LP compressor may be designed such that equivalent thrust can be provided with a smaller diameter compressor, which in turn will make a smaller diameter nacelle reducing the overall airframe weight and drag. Additionally, examples of the present disclosure are described in some examples with full authority digital engine control (FADEC) logic being employed to control the operation of the gas turbine engine system. However, the use of any suitable control systems is contemplated.

Examples of the present disclosure relate to techniques, and gas turbine engine systems for performing such techniques, that include increasing the amount of power generation on a generator (and therefore torque) connected to a LP spool shaft during the initial deceleration of the engine. In some instances, the additional torque may start to be applied through the FADEC logic even before the thrust is reduced (e.g., before the fuel flow is reduced to the combustor). By adding this torque to the LP spool, the engine may be able to decelerate faster than would otherwise be possible allowing reduced working line excursion and in turn improved stall margin. This improved stall margin characteristic can be leveraged in the engine design to reduce weight and airframe drag as mentioned previously. It is proposed that, in some examples, the energy generated by the generator be stored in an appropriate energy storage means, for example a battery, and/or directed to other electrical systems of an aircraft such as an environmental control system (ECS) of an aircraft (e.g., where an increased electrical load is temporarily applied with the ECS).

One potential challenge with this approach is that a gas turbine engine may have reduced, and perhaps insufficient stall margin should the generator fail. Accordingly, an engine design is also proposed that in this scenario the FADEC reverts to a reversionary logic that limits the acceleration and deceleration rates of the gas turbine engine such that stall margin can be maintained. Alternatively, or additionally, for emergency scenarios, such as during an aborted takeoff, it may be acceptable to allow the reduced stall margin since a nominal engine may have more margin than a deteriorated 'worst engine' that must be designed for. The impacts of having a stall/surge during and event such as an aborted takeoff may also be acceptable as the engine can subsequently be inspected for any damage. An example decision flow logic for this implementation is described further below with regard to FIG. 6.

Gas turbine engines may also incorporate stall/surge recovery logic that is executed by the FADEC when a stall or surge is detected. In some examples of the present disclosure, techniques that include the increase the LP generator torque/power generation in response to a surge or stall detection may be employed, e.g., by incorporating the action into the LP stall or surge recovery logic as well. In such instances, the added torque may cause the LP rotor to reduce speed while the HP spool remains at a relatively high-speed demanding higher flow. This may cause a reduction in the fan working line and allow the fan to recover from a stall or surge. In some examples, such stall/surge recovery logic is only executed in the case of a stall/surge and not necessarily during a commanded thrust change, as in the case described above.

FIG. 1 is a conceptual diagram illustrating an example vehicle in accordance with an example of the present disclosure. In the example of FIG. 1, the vehicle includes an aircraft 10. In other examples, the vehicle may include any type of gas turbine engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. The vehicle may be manned, semiautonomous, or autonomous.

Aircraft 10 includes a fuselage 12, wings 14, an empennage 16, two gas turbine engine systems 18A and 18B (collectively, "gas turbine engines 18A and 18B") as main propulsion engines. In other examples, aircraft 10 may include a single gas turbine engine such as engine 18A or 18B, or a plurality of propulsion systems such as two or more of engines 18A and 18B. As illustrated in FIG. 1, aircraft 10 is a twin-engine turbofan aircraft. In some examples, aircraft 10 may be any fixed-wing aircraft, including turbofan aircraft, turbojet aircraft, and turboprop aircraft. In some examples, aircraft 10 may be a rotary-wing aircraft or a combination rotary-wing/fixed-wing aircraft. Aircraft 10 may employ any number of wings 14. Empennage 16 may employ a single or multiple flight control surfaces. Gas turbine engines 18A and 18B may be the main propulsion systems of aircraft 10. Aircraft may also have more than two engines such as three or four engines or may have a single engine.

In accordance with some examples of the disclosure, one or both of gas turbine engine systems 18A and 18B may include a HP spool, one or more lower pressure (LP) spools (e.g., a single low-pressure spool or a low-pressure spool and intermediate pressure (IP) spool), and a generator coupled to a rotating shaft of a lower pressure (LP) spool. The systems may be configured such that the generator generates power from the rotation of the LP shaft, which results in a torque applied to the LP shaft. The amount of torque applied to the LP shaft may be selectively modified or otherwise adjusted based on the operation of the gas turbine engine (such as changes in thrust) to adjust the amount of torque applied to the LP shaft, e.g., to generally improve the operation of the gas turbine engine as described herein.

Figure 2A:
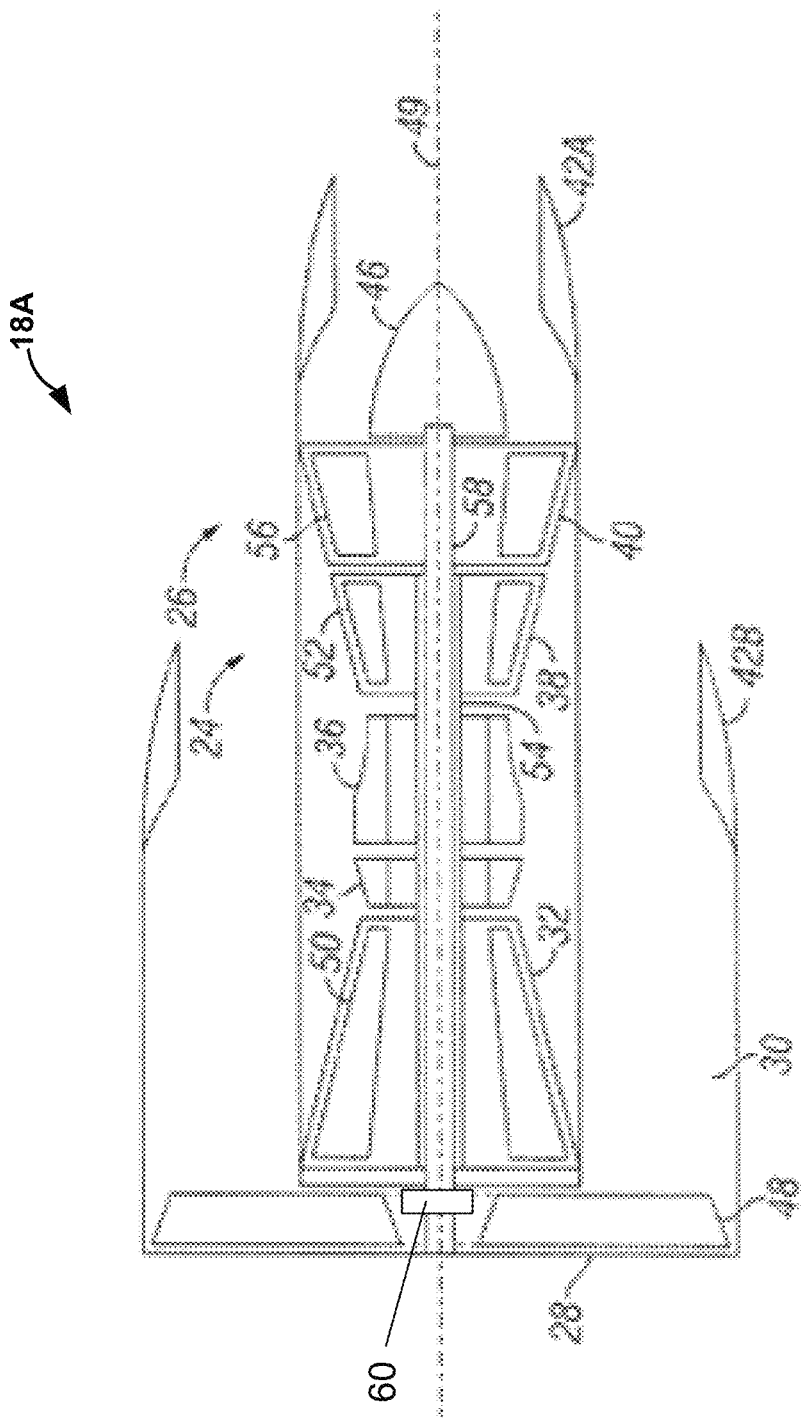
FIGS. 2A-2E are conceptual diagrams illustrating various example gas turbine engine systems including a generator coupled to a lower-pressure shaft of a low pressure or intermediate pressure spool assembly.

FIG. 2A is a conceptual and schematic diagram illustrating gas turbine engine system 18A in accordance with an example of the present disclosure. Although described herein as with respect to an aircraft propulsion system, in other examples, gas turbine engine 18A may be a propulsion system for providing propulsive thrust to any type of gas turbine engine powered vehicle, as discussed above, or configured to provide power to any suitable nonvehicle system including gas turbine engine 18A. Engine 18B may be the same or similar to engine 18A in FIG. 1.

Engine 18A may be a primary propulsion engine that provides thrust for flight operations of aircraft 10. In the example of FIG. 2A, engine 18A is a two-spool engine having a high-pressure (HP) spool (rotor) 24 and a low-pressure spool (rotor) 26. In other embodiments, engine 18A may include three or more spools, e.g., may include an IP spool and/or other spools and/or partial spools, e.g., on-axis or off-axis compressor and/or turbine stages (i.e., stages that rotate about an axis that is the same or different than that of the primary spool(s)). In one form, engine 18A is a turbofan engine. In other embodiments, engine 18A may be any other type of gas turbine engine, such as a turboprop engine, a turboshaft engine, a propfan engine, a turbojet engine or a hybrid or combined cycle engine. As a turbofan engine, low-pressure spool 26 is operative to drive a propulsor 28 in the form of a fan, which may be referred to as a fan system. As a turboprop engine, low-pressure spool 26 powers a propulsor 28 in the form of a propeller system (not shown), e.g., via a reduction gearbox (not shown). In other embodiments, propulsor 28 may take other forms, such as one or more helicopter rotors or tilt-wing aircraft rotors, for example, powered by one or more engines 18A in the form of one or more turboshaft engines.

In one form, engine 18A includes, in addition to fan 28, a bypass duct 30, a high-pressure (HP) compressor 32, a diffuser 34, a combustor 36, a high-pressure (HP) turbine 38, a low-pressure turbine 40, a first nozzle 42A, a second nozzle 42B, and a tailcone 46, which are generally disposed about and/or rotate about an engine centerline 49. In other embodiments, there may be, for example, an intermediate pressure spool having an intermediate pressure turbine or other turbomachinery components, such as those mentioned above. In one form, engine centerline 49 is the axis of rotation of fan 28, HP compressor 32, HP turbine 38 and turbine 40. In other embodiments, one or more of fan 28, HP compressor 32, HP turbine 38 and turbine 40 may rotate about a different axis of rotation.

In the depicted example, engine 18A core flow is discharged through first nozzle 42A, and the bypass flow from fan 28 is discharged through second nozzle 42B. In other embodiments, other nozzle arrangements may be employed, e.g., a common nozzle for core and bypass flow; a nozzle for core flow, but no nozzle for bypass flow; or another nozzle arrangement. Bypass duct 30 and HP compressor 32 are in fluid communication with fan 28. Second nozzle 42B is in fluid communication with bypass duct 30. Diffuser 34 is in fluid communication with HP compressor 32. Combustor 36 is fluidly disposed between HP compressor 32 and HP turbine 38. Turbine 40 is fluidly disposed between HP turbine 38 and first nozzle 42A. In one form, combustor 36 includes a combustion liner (not shown) that contains a continuous combustion process. In other embodiments, combustor 36 may take other forms, and may be, for example, a wave rotor combustion system, a rotary valve combustion system, a pulse detonation combustion system, a continuous detonation combustion system and/or a slinger combustion system, and may employ deflagration and/or detonation combustion processes.

Fan system 28 includes a fan rotor system 48 driven by low-pressure spool 26. In various examples, fan rotor system 48 may include one or more rotors that are powered by turbine 40. In various embodiments, fan 28 may include one or more fan vane stages (not shown in FIG. 2A) that cooperate with fan blades (not shown) of fan rotor system 48 to compress air and to generate a thrust-producing flow. Bypass duct 30 is operative to transmit a bypass flow generated by fan 28 around the core of engine 18A. HP compressor 32 includes a compressor rotor system 50. In various examples, compressor rotor system 50 includes one or more rotors (not shown) that are powered by HP turbine 38. HP compressor 32 also includes a plurality of compressor vane stages (not shown in FIG. 2A) that cooperate with compressor blades (not shown) of compressor rotor system 50 to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages.

HP turbine 38 includes a turbine rotor system 52. In various embodiments, turbine rotor system 52 includes one or more rotors having turbine blades (not shown) operative to extract power from the hot gases flowing through HP turbine 38 (not shown), to drive compressor rotor system 50. HP turbine 38 also includes a plurality of turbine vane stages (not shown) that cooperate with the turbine blades of turbine rotor system 52 to extract power from the hot gases discharged by combustor 36. In one form, the turbine vane stages are stationary. In other embodiments, one or more vane stages may be replaced with one or more counter-rotating blade stages. Turbine rotor system 52 is drivingly coupled to compressor rotor system 50 via a shafting system 54 (also referred to as high-pressure (HP) shaft 54). Turbine 40 includes a turbine rotor system 56. In various embodiments, turbine rotor system 56 includes one or more rotors having turbine blades (not shown) operative to drive fan rotor system 48. Turbine 40 may also include a plurality of turbine vane stages (not shown in FIG. 2A) that cooperate with the turbine blades of turbine rotor system 56 to extract power from the hot gases discharged by HP turbine 38. In one form, the turbine vane stages are stationary. In other embodiments, one or more vane stages may be replaced with one or more counter-rotating blade stages. Turbine rotor system 56 is drivingly coupled to fan rotor system 48 via shafting system 58 (also referred to as low-pressure shaft 58). In various embodiments, shafting systems 54 and 58 include a plurality of shafts that may rotate at the same or different speeds and directions for driving fan rotor system 48 rotor(s) and compressor rotor system 50 rotor(s). For ease of description, shafting system 54 of HP spool 24 is described primarily as HP shaft 54 but is it recognized that system 54 is not limited to a single shaft. Likewise, shafting system 58 of low-pressure spool 26 is described primarily as low-pressure shaft 58 but it is recognized that system 58 is not limited to a single shaft. Turbine 40 is operative to discharge the engine 18A core flow to first nozzle 42A.

During normal operation of gas turbine engine 18A, air is drawn into the inlet of fan 28 and pressurized. Some of the air pressurized by fan 28 is directed into HP compressor 32 as core flow, and some of the pressurized air is directed into bypass duct 30 as bypass flow. HP compressor 32 further pressurizes the portion of the air received therein from fan 28, which is then discharged into diffuser 34. Diffuser 34 reduces the velocity of the pressurized air, and directs the diffused core airflow into combustor 36. Fuel is mixed with the pressurized air in combustor 36, which is then combusted. The hot gases exiting combustor 36 are directed into turbines 38 and 40, which extract energy in the form of mechanical shaft power to drive HP compressor 32 and fan 28 via respective HP shaft 54 and low-pressure shaft 58. The hot gases exiting turbine 40 are discharged through first nozzle 42A, and provide a component of the thrust output by engine 18A.

As shown in FIG. 2A, engine 18A includes generator 60. In the illustrated example, generator 60 is positioned between fan system 48 and HP compressor 32 along centerline 49. Generator 60 may include any suitable type and/or arrangement of an electrical machine such as an electro-mechanical generator that operates in the manner described herein, e.g., by generating power from the rotation of low-pressure shaft 58, with the amount of power being generated being adjusted in some circumstances based on the operation of engine 18A. For example, the amount of power being generated by generator 60 may be increased in combination with a decrease in thrust by engine 18A, e.g., to temporarily increase the torque applied on low-pressure shaft 58 when the thrust generated by engine 18A is initially reduced.

In some examples, generator 60 may be positioned in front of the nose cone or spinner of engine 18A. In other examples, rather than being embedded and positioned coaxially with low-pressure shaft 58, generator 60 may be mounted on an externally mounted gearbox which is power by a shaft driven from the LP rotor (or IP rotor in a three-spool engine).

In some examples, generator 60 may be an electrical machine that is configured to be selectively operated as an electric generator or an electric motor. Example of suitable motor-generators 60 may include one or more of the examples of the motor-generator and motor generator assemblies disclosed within U.S. patent application Ser. Nos. 15/590,623; 15/590,606; 15/590,581; and Ser. No. 15/590,554, filed May 9, 2017. The entire content of these applications are incorporated by reference herein. In some examples, generator 60 may be selectively operated to extract and/or provide power to the low-pressure shaft 58. For example, generator 60 may be configured for selective operation between a generation mode to generate electrical power from rotation of the low-pressure turbine 40 and in a drive or motor mode to receive electrical power for applying rotational force to the low-pressure shaft 58. However, in some examples of the disclosure, generator 60 is an electrical machine that operates in a generator mode but not a motor mode.

In the example of FIG. 2A as well as the other examples turbine engine systems described herein, generator 60 may be an embedded electrical machine in that the stator and rotor of electrical machine core are positioned coaxially with low-pressure shaft 58. The stator of generator 60 may be fixed against rotation relative to the low-pressure shaft 58 and a rotor may be coupled to the low-pressure shaft 58 for rotation therewith. The rotor may be attached to a mount of the low-pressure shaft 58 positioned axially between shaft bearings of the low-pressure shaft 58. The stator may include a number of stator windings positioned radially outward of the rotor, such that each stator winding is arranged in electromagnetic communication with the rotor In other examples, generator 60 may include a stator and rotor positioned non-coaxially, e.g., where the rotor of generator 60 is rotationally coupled to low-pressure shaft 58 via one or more other shafts and suitable gearing.

Figure 2B:
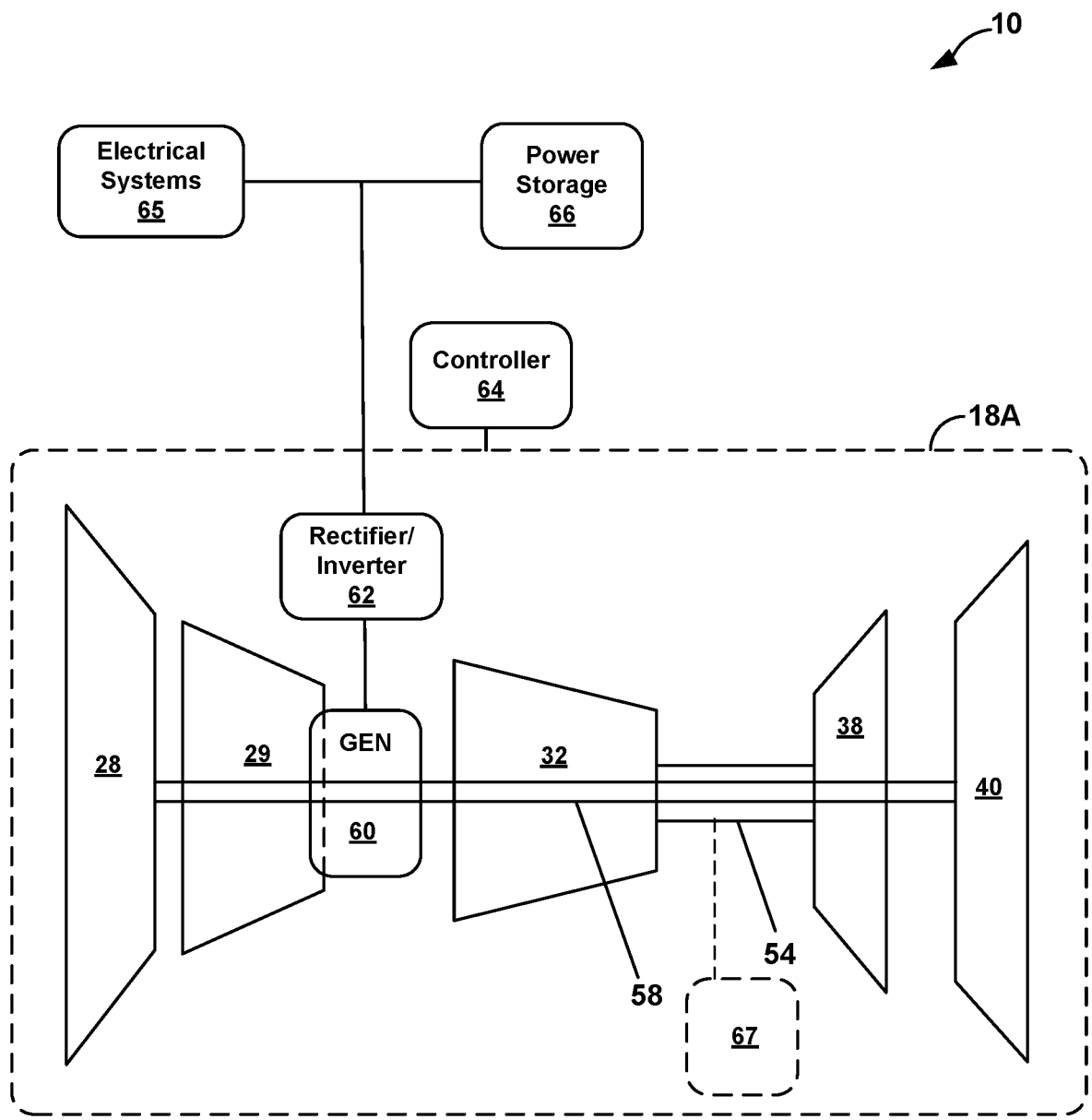

FIG. 2B is a schematic functional diagram illustrating additional components of engine system 18A of FIGS. 1 and 2A, and like features are similarly numbered. As noted above, engine system 18A may be a gas turbofan system. Engine 18A may include fan rotor system 48 that is rotationally coupled to low-pressure turbine 40 by low-pressure shaft 58, and HP compressor 32 rotationally coupled to HP turbine 38 by HP shaft 54. The speed of shaft 54 driving the HP compressor 32 may be different from that of the speed of shaft 58 driving the fan rotor system 28. The combination of HP compressor 32, HP turbine 38 and HP shaft 54 may be referred to as the HP spool assembly 24 or HP spool 24.

Unlike that of engine 18A shown in FIG. 2A, engine 18A of FIG. 2B includes low-pressure compressor 29. Low-pressure compressor 29 is coupled to rotationally coupled to low-pressure turbine 40 by low-pressure shaft 58. In some examples, low-pressure compressor 29 may be referred to as a booster. In some examples, low-pressure compressor 29 may be similar to that of HP compressor 32 and may include a compressor rotor system (not shown in detail in FIG. 2B). In various examples, the compressor rotor system includes one or more rotors (not shown) that are powered by low-pressure turbine 40. Low-pressure compressor 29 may also include a plurality of compressor vane stages (not shown in FIG. 2B) that cooperate with compressor blades (not shown) of the compressor rotor system to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages. In operation, low-pressure compressor 29 may operate to increase the pressure of the intake air, which is then further increase in pressure by HP compressor 32.

The combination of fan system 28, low-pressure compressor 29, low-pressure turbine 40 and low-pressure shaft 58 may be referred to as the low-pressure spool assembly 26 or low-pressure spool 26. Similar to that of engine 18A in FIG. 2A, engine 18A of FIG. 2B includes generator 60, which is operably coupled to low-pressure shaft 58, e.g., in an embedded (co-axial) with low-pressure shaft 58 or non-co-axial.

Engine system 18A also includes rectifier/inverter 62. The electrical systems 65 and power storage device 66 may be part of the aircraft system 10. System 10 also includes controller 64. Controller 64 may include control circuitry for the control of the engine systems and may control the rectifier 62. Controller 64 may include one or a combination of controllers as part of a control system that controls the operation of engine 18A and/or other components of system 10. For example, controller 64 represents more than one controller, wherein the more than one controller includes an engine controller. The engine controller may be part of the engine but may be physically located on the aircraft. One of the individual controllers of controller 64 controls the electrical loads and battery in aircraft 10 as part of system 10, e.g., in the manner described herein for increase the torque applied by generator 60 on shaft 58. As illustrated, all or a portion of controller 64 may be located on aircraft 10; however there may be some configuration where an engine controller is mounted on engine 18A.

For generator 60 the power is used by the electrical system 65 and power storage system 66, which are devices that can absorb relatively large amounts of power. As described herein, the amount of electrical load applied by electrical system 65 and/or power storage system 66 on generator 60 may be varied to vary the amount of torque load applied by generator 60 on low-pressure shaft 58, e.g., to decrease the rotational speed of low-pressure shaft 58 over a shorter period of time in combination with the reduction in thrust by engine 18A. The generator output voltage may be controlled by the rectifier 62 that may control the power input to power storage 66 on a DC bus. If the rectifier 62 is powering a DC bus with multiple power sources (not shown) then it may also control the generator power to the electrical system 65.

Controller 64 may be configured to control the components of engine 18A and/or aircraft 10 individually and selectively such that engine 18A and system 10 more generally implement the techniques described herein. Controller 64 may comprise any suitable arrangement of hardware, software, firmware, or any combination thereof, to perform the techniques attributed to controller 64 herein. Examples of controller 64 include any of one or more microprocessors, digital signal processors (DSPs), application specific integrated circuits (ASICs), field programmable gate arrays (FPGAs), processing circuitry, or any other equivalent integrated or discrete logic circuitry, as well as any combinations of such components. When controller 64 includes software or firmware, controller 64 further includes any necessary hardware for storing and executing the software or firmware, such as one or more processors or processing units. In some examples, all or portions of controller 64 may be embodied in a full authority digital engine control (FADEC) including an electronic engine controller (EEC) or engine control unit (ECU) and related accessories that control one or more aspects of the operation of engine system 18A.

In general, a processing unit may include one or more microprocessors, DSPs, ASICs, FPGAs, or any other equivalent integrated or discrete logic circuitry, as well as any combinations of such components. Although not shown in FIG. 2B, controller 64 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 64 (e.g., may be external to a package in which controller 64 is housed).

Although controller 64 is generally described as being the primary unit for controlling each of the engine components of system 18A for performing the techniques described herein, in some examples, the individual components of system 18A may include additional functionality for performing some or all the operations described below with respect to controller 64. For example, a combination of one or more of HP compressor 32, turbines 38, 40, fan system 28, low-pressure compressor 29, generator 60, rectifier/inverter 62, and the like may include components for controlling the operation of system 18A in the manner described herein. As described herein, generator 60, is configured to generate power from the rotation of shaft 58, e.g., as driven by turbine 40. The electrical energy generated by generator 60 in a generator mode may be used to provide operational power to one or more electrically operated systems 65 of aircraft 10 (FIG. 1). In some examples, generator 60 may be configured to generate continuous aircraft or transient system power also defined by the desired end user application. Example electrical systems 65 that may be powered by generator 60 include hydraulic and/or pneumatic drive systems, environmental control systems, communications systems, directed energy systems, radar systems and component cooling systems. Electrical systems 65 may be any system having electrical components requiring power to operate. When operation power is supplied by a generator such as generator 60, electrical system 65 may apply an electrical load on the generator in order for electrical system 65 to operate in the desired manner.

Additionally, or alternatively, all or some of the power generated by generator 60 may be stored by power storage device 66. In such an example, rectifier/inverter 62, under the control of controller 64 may increase its output voltage to input all or a portion of the power generated by generator 60 as direct current to power storage device 66 for storage of the power. Power storage device 66 may be any suitable device such as one or more suitable batteries or capacitors. Engine 18A may utilize the power stored in power storage device at times when the power generated by generator 60 is relatively low. Power storage device 66 may apply (e.g., selectively) an electrical load on generator 60 to recharge the power storage device (e.g., battery). The electrical load applied by power storage device 66 on generator 60 may increase the torque on LP shaft 58.

As described herein, the amount of power generated by generator 60 may be adjusted based during the operation of engine 18A, e.g., when engine 18a is providing propulsion for aircraft 10. The amount of power generated by generator 60 may be adjusted by adjusting the electrical load applied to generator 60, e.g., by power storage 66 and/or electrical systems 65. For example, an increase in electrical load applied by power storage 66 and/or electrical systems 65 on generator 60 may increase the power generated/output by generator 60. Conversely, a decrease in electrical load applied by power storage 66 and/or electrical systems 65 on generator 60 may decrease the power generated/output by generator 60. An adjustment to the amount of power generated by generator 60 may result in a corresponding adjustment to the amount of torque applied to low-pressure shaft 58, where the torque applied to the low-pressure shaft 58 may be resistive to the rotation of shaft 58. For example, an increase in electrical load applied by power storage 66 and/or electrical systems 65 on generator 60 may increase the torque applied by generator 60 on LP shaft 58. Conversely, a decrease in electrical load applied by power storage 66 and/or electrical systems 65 on generator 60 may decrease the torque applied by generator 60 on LP shaft 58. In this manner, generator 60 may be controlled by the electrical loads to apply a tailored amount of torque to low-pressure shaft 58 at a given point in time by selectively adjusting the amount of power generated by generator 60, e.g., in combination with the acceleration and/or deceleration of engine 18A.

As noted above, in some examples, the electrical load applied by electrical system 65 and/or power storage system 66 on generator 60 may be increased to increase the torque applied by generator 60 to low-pressure shaft 58 in combination with the deceleration of aircraft 10 (or other reduction in thrust generated by engine 18A). The increase in torque may decrease the deviation from a working line compared to the deviation that may normally result during the initial deceleration of aircraft 10 without such an increase in torque applied to low-pressure shaft 58.

Figure 2C:
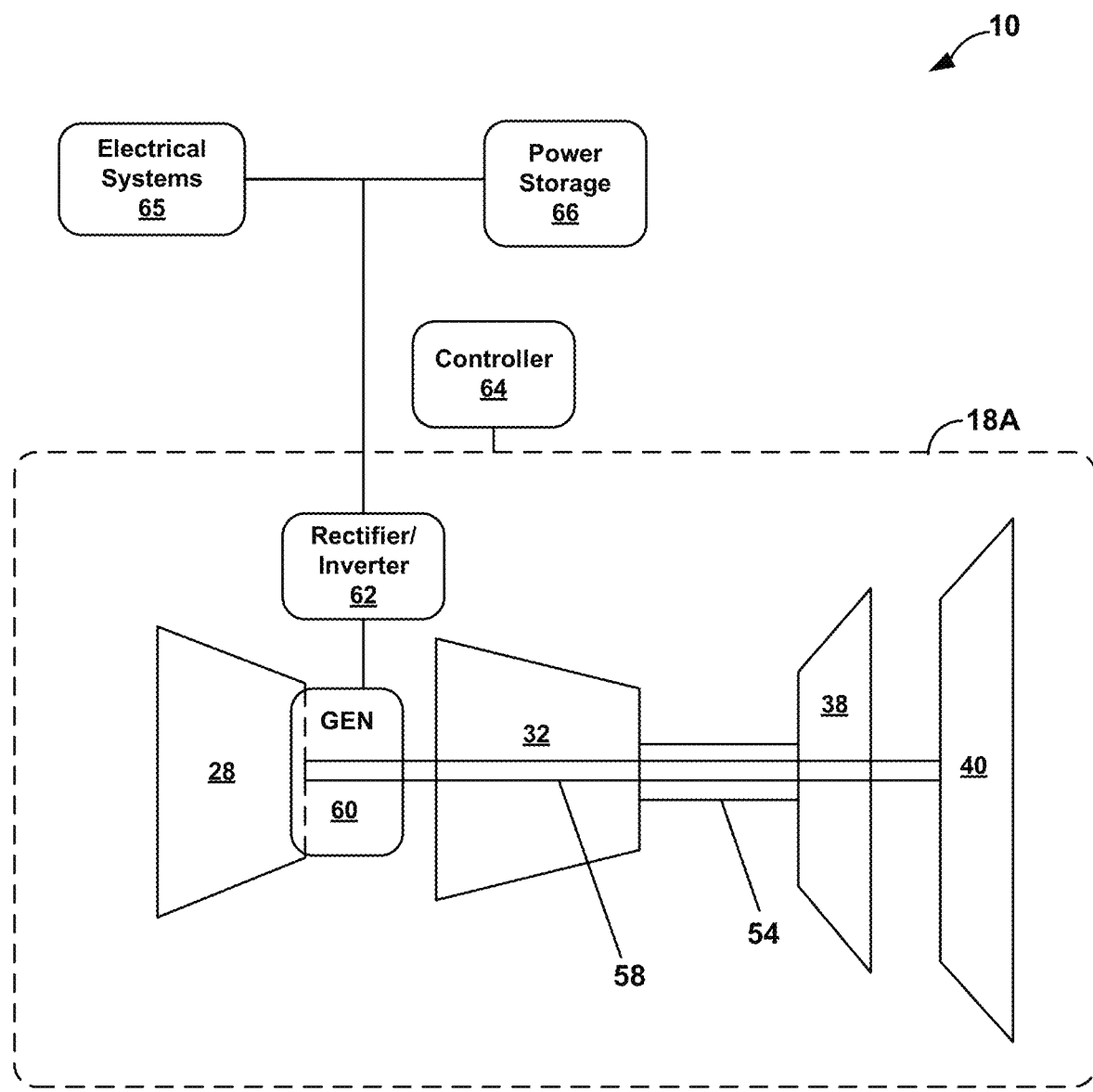

FIG. 2C is a schematic functional diagram illustrating another example of engine 18A in FIG. 1. Engine 18A in the example of FIG. 2C may be substantially similar to that of the example of FIG. 2B, and like features are similarly numbered. However, in the example of FIG. 2C, engine 18A may be a gas turbojet system compared to a gas turbofan system such as that shown in FIGS. 2A and 2B. LP shaft 58 in the example of FIG. 2C drives fan 28 but there is no bypass like that in FIGS. 2A and 2B so substantially all the intake air passes through the core e.g., all the fan air being absorbed by HP compressor 32. In some examples, engine 18A in FIG. 2C may include a low-pressure compressor (not shown) driven by LP shaft 58 along with fan 28, e.g., in a manner similar to that shown in the example of FIG. 2B with low-pressure compressor 29. In such an example, the lower pressure spool assembly may include the low-pressure compressor 29, fan 28, LP shaft 58 and LP turbine 40.

As described herein, generator 60, under the control of rectifier 62, is configured to generate power from the rotation of shaft 58, e.g., as driven by turbine 40. When generator 60 is generating power from the rotation of shaft 58, a torque may be applied on shaft 58 of the LP spool, e.g., in opposition to the rotation of shaft 58. In accordance with examples of the disclosure, the amount of torque applied by generator 60 to shaft 58 of the LP spool may be tailored or otherwise selectively adjusted by selectively adjusting the amount of power generated by generator 60.

Figure 2D:
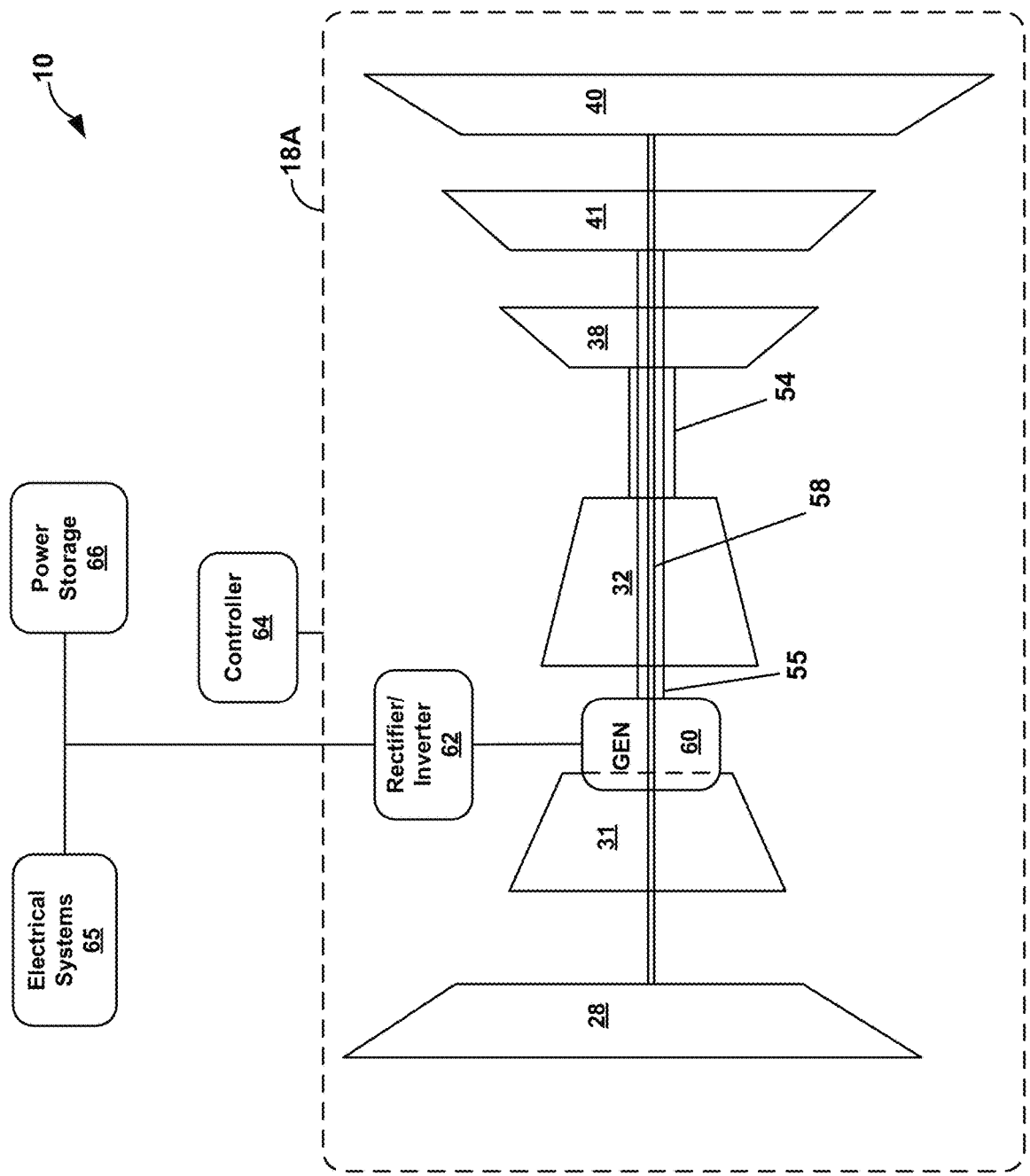

FIG. 2D is a schematic functional diagram illustrating another example of engine 18A in FIG. 1. Engine 18A in the example of FIG. 2D may be substantially similar to that of the example of FIG. 2B, and like features are similarly numbered. However, in the example of FIG. 2D, engine 18A may be a three-spool, gas turbofan system compared to a two-spool system such as that shown in FIGS. 2A and 2B. For example, in FIG. 2D, engine 18A includes IP compressor 31 and IP turbine 41, which are rotationally coupled by IP shaft 55 with turbine 41 driving compressor 31 by shaft 55. In such an example, engine 18A may include an intermediate pressure spool assembly including IP compressor 31, IP shaft 55 and IP turbine 41, along with fan 28, turbine 40, and shaft 58, and the HP spool assembly including HP compressor 32, HP turbine 38, and HP shaft 54.

IP compressor 31 may be similar to that of HP compressor 32 and may include a compressor rotor system (not shown in detail in FIG. 2D). In various examples, the compressor rotor system includes one or more rotors (not shown) that are powered by IP turbine 41. IP compressor 31 may also include a plurality of compressor vane stages (not shown in FIG. 2D) that cooperate with compressor blades (not shown) of the compressor rotor system to compress air. In various embodiments, the compressor vane stages may include a compressor discharge vane stage and/or one or more diffuser vane stages. In one form, the compressor vane stages are stationary. In other embodiments, one or more vane stages may be replaced with one or more counter-rotating blade stages. In operation, IP compressor 31 may operate to increase the pressure of the air from fan 28, which is then further increased in pressure by HP compressor 32.

IP turbine 41 may be similar to that of HP turbine 38 or turbine 40. In various embodiments, turbine 41 includes a rotor system (not shown) that includes one or more rotors having turbine blades (not shown) operative to extract power from the hot gases flowing through IP turbine 41 to drive IP compressor 31 via IP shaft 55. Engine 18A of FIG. 2D also includes generator 60, which is operably coupled to IP shaft 55, e.g., in an embedded (co-axial) with IP shaft 55 or non-co-axial. Generator 60, under the control of controller 64, is configured to generate power from the rotation of shaft 55, e.g., as driven by IP turbine 41. When generator 60 is generating power from the rotation of shaft 55, a torque may be applied on shaft 55 of the IP spool, e.g., in opposition to the rotation of shaft 55. In accordance with examples of the disclosure, the amount of torque applied by generator 60 to shaft 55 of the IP spool may be tailored or otherwise selectively adjusted by selectively adjusting the amount of power generated by generator 60.

Figure 2E:
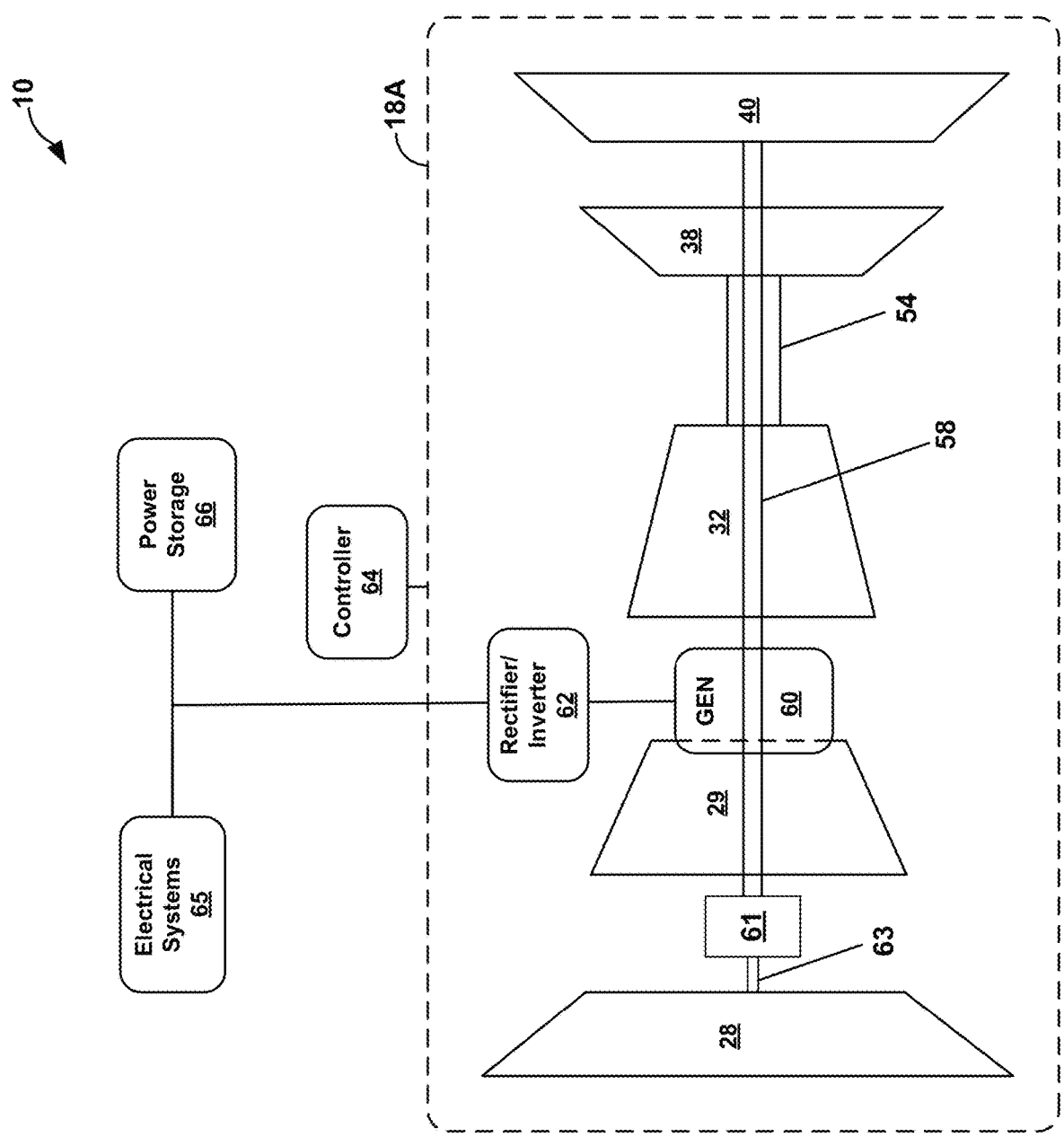

FIG. 2E is a schematic functional diagram illustrating another example of engine 18A in FIG. 1. Engine 18A in the example of FIG. 2E may be substantially similar to that of the example of FIG. 2B, and like features are similarly numbered. However, in the example of FIG. 2E, engine 18A may be a two and half spool, gas turbofan system compared to a two-spool system such as that shown in FIGS. 2A and 2B. For example, as shown in FIG. 2E, engine 18A includes gearbox 61 and shaft 63 which couple fan 28 to LP shaft 58. The rotation of fan 28 is driven by LP turbine 40 via gearbox 61 and shaft 63. In such a configuration, the rotational speed of fan 28 may be decoupled from the rotational speed of LP shaft 58, e.g., with shaft 63 being configured to rotate fan 28 at a lower speed than LP shaft 58.

Figure 4:
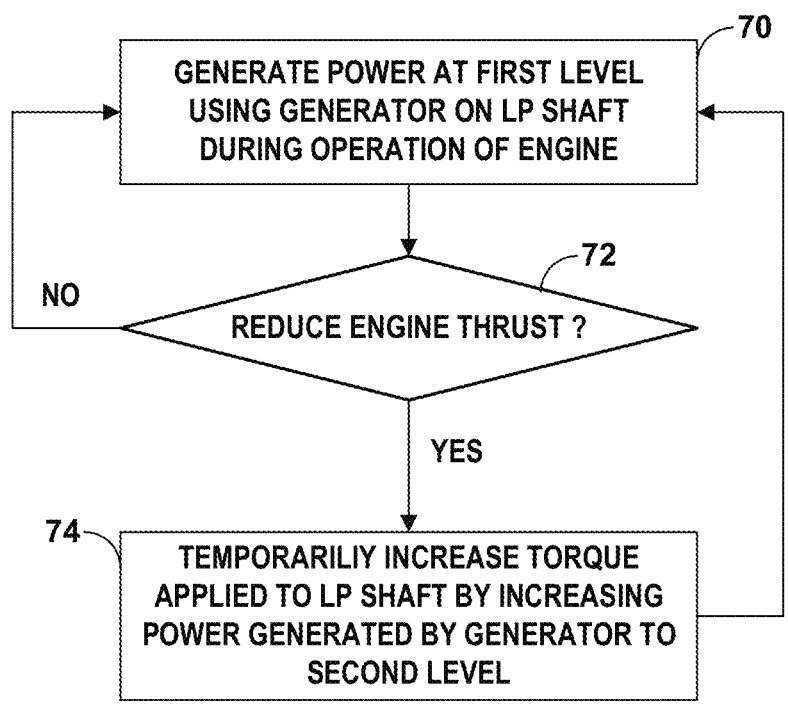
FIG. 4 is a flow diagram illustrating an example technique for operating a gas turbine engine system in accordance with examples of the disclosure.

FIG. 4 is a flow diagram illustrating an example technique for operating a gas turbine engine with a generator coupled to a LP spool assembly in accordance with examples of the disclosure. For ease of description, the example technique of FIG. 4 is described with respect to engine system 18A shown in FIG. 2B, although any suitable system may implement the example technique of FIG. 4, including those other example engine systems described herein.

As shown in FIG. 4, during the operation of engine 18A after start-up, e.g., to provide propulsion for aircraft 10 as described above, controller 64 may control generator 60 to generate power at a first level from the rotation of LP shaft 58 (70). The power generated at the first level by generator 60 may be used by aircraft to supply operational power to one or more of the electrical systems of aircraft 10 and/or may be stored in power storage device 66, e.g., for later use. The power generator at the first level may correspond to a first amount of electrical load applied on generator, e.g., for the operation of electrical systems 65 and/or power storage device 66. With generator 60 operating to generate power at the first level, a first level of torque may be applied to LP shaft 58 which is in opposition to the rotation of LP shaft 58.

While generator 60 is operated to generate the power at the first level, engine 18A may provide a first level of thrust for aircraft 10. The generation of power at the first level may be maintained until controller 64 determines that the thrust from engine 18A should be reduced from the first level (72). For example, at some subsequent point in time, controller 64 may receive a command to reduce the thrust generated by engine 18A to decelerate aircraft 10 (72). The reduction in thrust may be associated with an indicating that aircraft 10 should decelerate, e.g., based on an engine thrust lever being reduced by an operator.

In response to determining that the thrust generated by engine 18A should be reduced, the electrical loads from the electrical system 65 and/or power storage system 66 may increase (e.g., temporarily) the amount of torque applied to LP shaft 58 in combination with reducing the thrust generated by engine 18A by increasing the level of power generated by generator 60 from the first level to a second level greater than the first level (74). The increase in amount of power generated by generator 60 and, thus, the increase in torque applied by generator 60 to LP shaft 58, may be carried out in combination with reducing the amount of thrust generated by engine 18A from a first level of thrust to a second level of thrust that is lower that the first level.

Generator 60 may increase the level of power generated from the first level to the second level using any suitable technique that also results in an increase in torque applied to LP shaft 58. For example, controller 67 with rectifier/inverter 62 may increase the electrical load applied on generator 60 by electrical systems 65 and/or power storage 66. In some examples, to increase the electrical load applied on generator 60, the electrical power supplied to electrical systems 65 for operation may be taken from generator 60, e.g., instead of other generators or power sources on aircraft 10 and/or the power from generator 60 may directed to power storage, e.g., to charge battery. Rectifier 62 may be used to increase the power of generator 60 by increasing the electrical loads applied by electrical systems 65 and/or power storage 66.

All or a portion of the power generated by generator 60 may be directed to power storage device 66 through rectifier/inverter 62 for storage. Additionally, or alternatively, all or a portion of the power generated by generator 60 may be used to power one or more of the electrical systems 65 of aircraft 10. The output voltage of the rectifier 62 on a power bus shared with power storage 66 (e.g., a battery) and/or other generators of power of aircraft 10 may be raised to increase the power from generator 60 and, thus, increase the torque applied on LP shaft 58.

In some examples, the increase in power generation by generator 60 (e.g., from the increase in electrical load applied on generator 60) may be selected such that the speed of the LP rotor (e.g., compressor 29 in the example of FIG. 2B) decelerates consistent with the deceleration of the HP rotor speed to ensure the reduction in HP compressor 32 airflow is matched by the corresponding reduction in LP rotor speed to minimize the excursion of the transient engine operating line towards the LP compressor stall line. The LP rotor may refer to lower-pressure compressor 29 and/or fan 28. In the example of FIG. 2D, rather than the LP rotor, the increase in power generation by generator 60 may be selected such that the speed of the IP rotor (IP compressor 31) decelerates consistent with the deceleration of the HP rotor speed to ensure the reduction in HP compressor 32 airflow is matched by the corresponding reduction in IP rotor speed to minimize the excursion of the transient engine operating line towards the IP compressor stall line.

In some examples, the increase in power output by generator 60 (with the increase in load applied to generator 60) may depend on the rate at which the thrust from engine 18A is being reduced, e.g., since there may be a greater deviation from the working line associated with relatively fast reductions in thrust as compared to the same magnitude thrust reduction but over a longer period of time. The greater the rate at which the thrust is reduced, the greater the increase in power generated by generator 60, e.g., to increase the rate at which the rotational speed of LP shaft 58 is reduced by the increased torque application on LP shaft 58. In some examples, the increase in power generated by generator 60 may be selected such that the resulting increase in torque applied by generator 60 to LP shaft 58 decreases the deviation from a working line compared to the deviation that may normally result during the initial deceleration of aircraft 10 without such an increase in torque applied to LP shaft 58, e.g., as illustrated in FIG. 3B.

In some examples, the increase in torque applied by generator 60 to the LP shaft 58 may increase the rate at which the rotational speed of LP shaft 58 decreases during the reduction in the engine thrust (e.g., the rotational speed of LP shaft 58 is decreases at a greater rate compared to instances in which the torque applied by generator 60 is not increased). In some examples, the increase in torque applied to LP shaft 58 is configured to reduce a time period over which the rotational speed of LP shaft 58 decreases during the reduction in engine thrust (e.g., the time period that the rotational speed decreases from an initial speed to a lower speed may be reduced with the application of the increased torque compared to the amount of time for the speed reduction without the application of the increased torque by generator 60). In some examples, the increase in torque applied to LP shaft 58 is configured to decrease the transient deviation of LP compressor 29 from the working line of LP compressor 29 during the reduction in engine thrust. In each instance, the increase in torque applied to LP shaft 58 may be configured to prevent stall or surge of LP compressor 29 due to the HP compressor 32 decelerating faster than the LP compressor 29.

While the rotational speeds of HP compressor 32 and LP compressor 29 may be different in terms of magnitude, both the speed of HP compressor 32 and LP compressor 29 may be reduced during a decrease in engine thrust. The increased torque applied by generator 60 to LP shaft 58 may be configured to increase the rate at which the LP shaft decelerates, e.g., to better match the deceleration of HP compressor 32. The increase in power output of generator 60 (and timing of the power increase) may be selected such that the resulting increase in torque applied to LP shaft 58 results in a "matched" deceleration of the LP compressor 29 in view of the HP compressor deceleration ("matched" with respect to the steady state compressor operating lines compared to no increase in applied torque rather than the HP and LP compressors being matched in absolute rotational speed). Put another way, the increase in power output of generator 60 (and timing of the power increase) may be selected such that the resulting increase in torque applied to LP shaft 58 results in less transient deviation from the 'working line' for LP compressor 29. In this manner, the increase in torque applied by generator 60 may prevent LP compressor 29 from going into a stall as a result of not reducing its rotational speed fast enough during the deceleration because the HP compressor is decelerating faster reducing the airflow.

In some examples, the power output of generator 60 may be increased by at least about 75 percent or at least about 50 percent, such as, about 25 to about 75 percent in combination with the reduction in engine thrust (74). In some examples, the torques applied to LP shaft 58 may be increased by at least about 75 percent or at least about 50 percent, such as, about 25 to about 75 percent in combination with the reduction in engine thrust (74). However, other values are contemplated.

In some examples, generator 60 may increase power output by at least 200 kiloWatts (kW)), such as, about 100 kW to about 300 kW, e.g., by increasing the load applied on generator 60 by electrical systems 65 and/or power storage 66. However, other values are contemplated as the amount of power may be determined by the size and power of an engine and may be limited by the generator power and size.

One example of this disclosure may be employed by an engine system includes two generators operatively coupled, one to the HP rotor/HP shaft 54 and the other to the lower-pressure rotor/shaft 58 (e.g., as would be the case for engine 18A in FIG. 2B if another generator like generator 60 coupled HP shaft 54 such that the rotation of shaft 54 was used to generate power via the corresponding generator along with generator 60). An example of a second or another generator is shown in FIG. 2B as optional generator 67. In such a system, the electrical power and hence drag torque may be increased for generator 60 at the initiation of the engine deceleration or thrust decrease substantially simultaneously with the reduction in electrical power and drag for a generator 67 on the HP rotor of the same engine. Such a process may have an additional benefit as the LP rotor may be slowed and the HP rotor is not decelerated as rapidly so there is much less mismatch in the LP rotor and HP rotor speeds during the deceleration that would lead to compressor transient working line migration towards the stall line. In some examples, this may be accomplished by using generator 60 and the HP generator 67 to power the same DC power bus and controlling the proportion of power supplied by each generator using the corresponding generator rectifier. Raising the voltage of the LP rectifier relative to the HP generator rectifier may increase the proportion of power extracted from the generator 60 and hence increase LP rotor torque offtake at the same time as reducing the HP rotor torque offtake.

The thrust from engine 18A may be reduced using any suitable technique. For example, controller 64 may reduce the flow of fuel to the combustor of engine 18A such as combustor 36 of FIG. 2A. The thrust may be reduced by reducing the rate of change at which the fuel is supplied to the combustor (reducing the rate of change of the mass flowrate of fuel, e.g., as compared to reducing the mass flow rate of the fuel itself). Additionally, or alternatively, the thrust may be reduced by closing the variable compressor guide vanes or opening of engine compressor bleed valves.

As noted above, the increase in power generated by generator 60 (e.g., by increasing the electrical load applied on generator 60 by electrical systems 65 and/or power storage device 66) may be carried out in combination with the reduction in thrust, e.g., so that the increase in torque applied by generator 60 on LP shaft is in combination with the reduction in thrust. For example, in some instances, the increase in power generation by generator 60 may be controlled by controller 64 such that the power generation increase occurs before or at substantially the same time at controller 64 initiates the reduction in thrust, e.g., when the flow of fuel is reduced. In some examples, the increase in power generation by generator 60 may be controlled by controller 64 such that the power generation increase occurs less than one second of controller 64 initiating the reduction in thrust.

Generator 60 may increase the level of power output by generator 60 for a period of time in combination with the reduction in engine lower-pressure rotor/shaft (e.g., compressor 29/shaft 58) speed and thrust, e.g., before returning to the first level of power that was generated prior to the increase power in response to the reduction in thrust (70). In some examples, the generator power can be reduced once the LP rotor/shaft speed is adequately low relative to the HP compressor 32 speed which controls the core flow or when the HP and LP speeds closely match the relationship for steady state engine operation.

Figure 5:
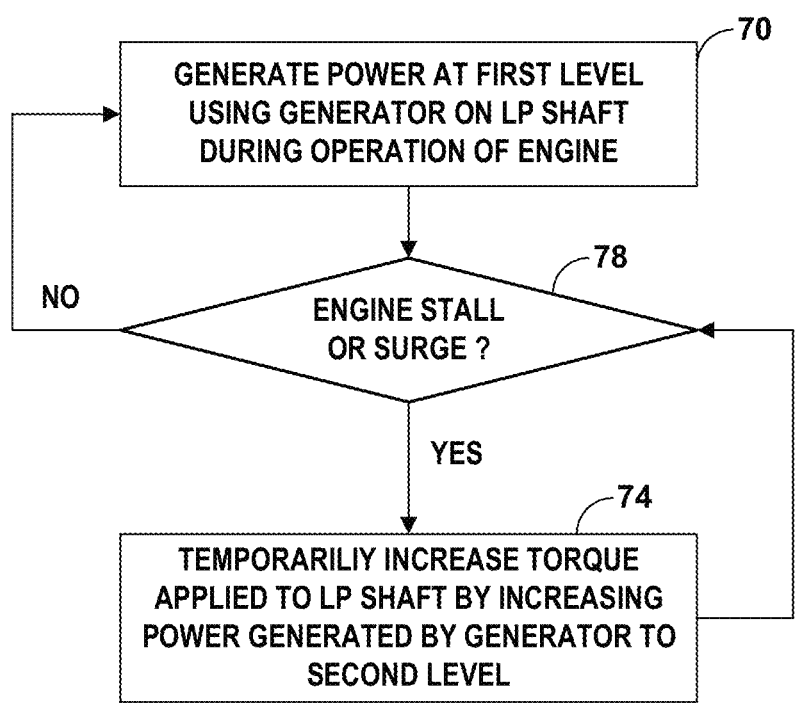
FIG. 5 is a flow diagram illustrating another example technique for operating a gas turbine engine system in accordance with examples of the disclosure.

FIG. 5 is a flow diagram illustrating another example technique for operating a gas turbine engine with a generator coupled to a LP spool assembly in accordance with examples of the disclosure. Again, for ease of description, the example technique of FIG. 5 is described with respect to engine system 18A shown in FIG. 2B, although any suitable system may implement the example technique of FIG. 5, including those other example engine systems described herein. The example of FIG. 5 may be similar to that of the example of FIG. 4 in that the amount of power generated by generator 60 is adjusted to adjust the torque applied to LP shaft 58 during the operation of engine 18A. The adjustment to the torque in the process of FIG. 5 may be accomplished as described above for the process of FIG. 4. Likewise, the techniques for adjusting the torque applied on LP shaft 58 with regard to the process of FIG. 5 may be employed in the process of FIG. 4. In the example of FIG. 5, the power is adjusted in response to the detection of a stall or surge of engine 18A.

As shown in FIG. 5, during the operation of engine 18A after start-up, e.g., to provide propulsion for aircraft 10 as described above, controller 64 may control generator 60 to generate power at a first level from the rotation of LP shaft 58 (70). The power generated at the first level by generator 60 may be used by aircraft to supply operational power to one or more of the electrical systems of aircraft 10 and/or may be stored in power storage device 64, e.g., for later use. With generator 60 operating to generate power at the first level, a first level of torque may be applied to LP shaft 58 which is in opposition to the rotation of LP shaft 58.

While generator 60 is operated to generate the power at the first level, engine 18A may provide a first level of thrust for aircraft 10. Controller 64 may control generator 60 to maintain the generation of power at the first level until controller 64 detects a stall or surge of engine 18A (78). For example, at some subsequent point in time, controller 64 may detect the stall or surge based on a sudden drop in compressor outlet pressure or reversal in air flow direction in the compressor. A stall condition may be detected when there is a sudden drop in compressor outlet pressure. A surge condition may be detected when there is a sudden large drop in compressor outlet pressure or reversal of compressor air flow direction.

An engine surge or stall could be caused by a bird strike or foreign object damage in the compressor at high engine power or it could be caused by engine or compressor deterioration. A surge may tend to occur at high engine power conditions whereas a stall may occur at a lower engine power. It may also be a characteristic of the engine or compressor whether a stall or surge occurs at a given condition.

In response to detecting a stall or surge of engine 18A, controller 64 may increase (e.g., temporarily) the amount of torque applied to LP shaft 58 in combination with the stall or surge of engine 18A by increasing the level of power generated by generator 60 from the first level to a second level greater than the first level (74). The increase in amount of power generated by generator 60 and, thus, the increase in torque applied by generator 60 to LP shaft 58, may be carried out during the stall or surge of engine 18A. The increased amount of torque during the stall or surge may cause LP rotor(s) of the LP spool to reduce speed while the HP spool remains at a relatively high-speed demanding higher flow. This may cause, e.g., a speed reduction in the lower-pressure compressor 29 (or fan 28 in the example of FIG. 2C or IP compressor 31 in the example of FIG. 2D) working line and allow the compressor 29 to recover from a stall or surge.

Generator 60 may increase the level of power generated from the first level to the second level using any suitable technique that also results in an increase in torque applied to LP shaft 58. For example, the load applied on generator 60 may be increased from a first level (which may be zero or non-zero) to a second level by providing additional electric power input to the battery of power storage 66 and/or electrical systems 65 of aircraft 10 such as aircraft electrical accessories. All or a portion of the power generated by generator 60 may be directed to power storage device 66 through rectifier/inverter 62 for storage. Additionally, or alternatively, all or a portion of the power generated by generator 60 may be used to power one or more of the electrical systems of aircraft 10.

Similar to that described above for an example engine also having a generator on the HP rotor/shaft (e.g., HP compressor 32/shaft 54), one example of this concept is where the electrical power and hence drag torque is increased for generator 60 at the initiation of the engine deceleration or thrust decrease simultaneous with the reduction in electrical power and drag for a generator on the HP rotor of the same engine. This may provide an additional benefit as the LP rotor is slowed but the HP rotor is not decelerated as rapidly so there is much less mismatch in the LP rotor and HP rotor speeds during the deceleration that would lead to compressor transient working line migration towards the stall line.

The increase in power generation by generator 60 may be selected such that the LP compressor airflow is better matched with the HP compressor airflow to recovery from the surge or stall and prevent a re-occurrence of the surge or stall. In some examples, generator 60 may increase power output by at least 200 kW, such as about 100 kW to about 300 kW. In some examples, the increase in power output by generator 60 may depend on the amount the thrust from engine 18A is being reduced. The more the thrust is reduced, the greater the increase in power generated by generator 60. In some examples, the increase in power generated by generator 60 may be selected such that the resulting increase in torque applied by generator 60 to LP shaft 58 decreases the deviation from a working line compared to the deviation that may normally result during the initial deceleration of aircraft 10 without such an increase in torque applied to LP shaft 58, e.g., as illustrated in FIG. 3B.

Generator 60 may increase the level of power output by generator 60 for a period of time in combination with the stall or surge condition detected by controller 60, e.g., before returning to the first level of power that was generated prior to the increase power in response to the stall or surge detection (70). In some examples, as indicated in FIG. 5, generator 60 may operate to generate the higher level of power output until the stall or surge condition of engine 18A is no longer detected or present. In some examples, the period of time may be about 4 seconds depending on the LP speed, e.g., before returning to the first power level or a lower power level.

As described above, some examples of the disclosure employ a generator, such as generator 60, coupled to the shaft of an LP spool assembly to apply an increased level of torque in combination with a reduction in thrust by engine 18A. An example of such a technique is described with regard to FIG. 4. One condition that may be present with examples of such an approach is that a gas turbine engine may have reduced, and perhaps insufficient stall margin should the generator fail. Accordingly, an engine design and operating procedure may include a FADEC or other controller that reverts to a reversionary logic, which limits the acceleration and deceleration rates of the gas turbine engine such that stall margin can be maintained. For example, the decelaration rates could be halved in this condition.

Figure 6:
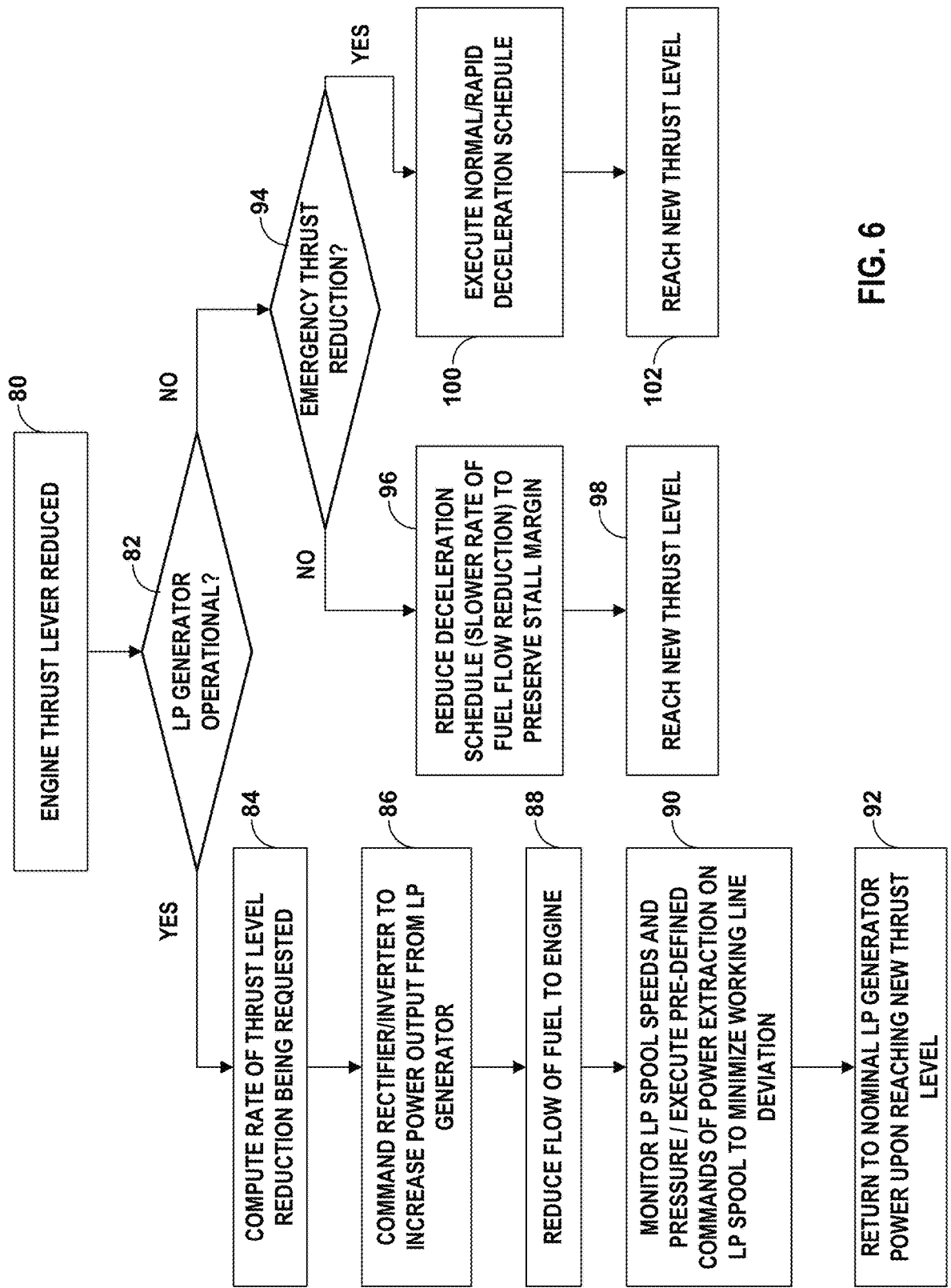
FIG. 6 is a flow diagram illustrating another example technique for operating a gas turbine engine system in accordance with examples of the disclosure.

Alternatively, or additionally, for emergency scenarios, such as during an aborted takeoff of an aircraft such as aircraft 10, it may be acceptable to allow the reduced stall margin since a nominal engine may have more margin than a deteriorated 'worst engine' that must be designed for. The impacts of having a stall/surge during and event such as an aborted takeoff may also be acceptable as the engine can subsequently be inspected for any damage. FIG. 6 is a flow diagram illustrating an example technique implementing one example of such flow logic. For ease of description, the example technique of FIG. 6 is described with respect to engine system 18A shown in FIG. 2B, although any suitable system may implement the example technique of FIG. 6, including those other example engine systems described herein.

As shown in FIG. 6, controller 64 may determine that an engine thrust level is reduced (or otherwise receive an input indicating that the thrust of engine 18A should be reduced) (80). Upon receiving the input, controller 64 may determine whether generator 60 is operational (82). For example, controller 64 may determine whether generator 60 is operational to generate power from the rotation of LP shaft 58 and/or operational to increase the level of power being generated beyond the level currently being generated by generator 60 (82). Controller 64 may make such a determination by monitoring generator voltage and current outputs relative to the expected outputs for this speed in normal non-failure operation.

If controller 64 determines that generator 60 is operational, controller 64 may compute or otherwise determine the rate of thrust level reduction that is being requested with the received input (84), and then command rectifier/inverter 62 to increase the power output from generator 60 (86). As described above, the specific level of power increase outputted by generator 60 may be determined based on the amount or rate of thrust level being requested (84). Once the power output generated by generator 60 is decrease, controller 64 may reduce the flow of fuel to the combustor of engine 18A to reduce the thrust at the determined rate (88). Controller 64 may then monitor the speed of LP shaft 58 and pressure and/or execute pre-defined commands of power extraction on the LP spool assembly to minimize the deviation from the working line for engine 18A during the deceleration/thrust reduction (90) based on the deceleration of the HP speed. Once the new thrust level is reached after the reduction, controller 64 may then control generator 60 to return to a nominal level of power generation (e.g., the power generation level prior to the increase in power generation associated with the thrust reduction) (92).

The technique performed by controller 64 upon determining that generator 60 is operational (Yes branch of decision 82) may be an example of the technique of FIG. 4, and the technique of FIG. 4 may be carried out by controller 64 upon determining generator 60 is operational in the example technique of FIG. 6.

Conversely, if controller 64 determines that generator 60 is not operational (82), then controller 64 may determine if the thrust reduction that is being requested (80) is an emergency thrust reduction (94). Examples of an emergency thrust reduction may include a thrust reduction associated with an aborted (rejected) takeoff, this condition may be determined based on the aircraft on ground indication for example weight on wheels, and the like. For an aborted (rejected) takeoff the consequences of an engine surge may be less severe than that for slow engine deceleration where the aircraft may run off the runway.

If controller 64 determines that the requested thrust reduction is an emergency thrust reduction (94), controller 64 may execute a rapid (e.g., typical) deceleration schedule without regard to the stall margin of engine 18A (100). For example, the rate at which the fuel is reduced to the combustor may be reduced at a rate that does not preserve a desired stall margin of engine 18A. The deceleration schedule may be maintained until the new reduced thrust level is reached (102). Alternatively or additionally, controller 64 may activate bleed valves or revert to a 'reversionary bleed valve schedule' or activate one-time use devices such as a burst disk to preserve surge margin. Alternatively, controller 64 may adjust the variable inlet guide vane/variable stator vane (VIGV/VSV) schedule. A stall may be accepted in some conditions.

If controller 64 determines that the requested thrust reduction is not an emergency thrust reduction (94), controller 64 may execute a reduced deceleration schedule (e.g., with a slower rate of fuel reduction compared to the rate employed for the emergency thrust reduction instance) to preserve a desired stall margin (96). The deceleration schedule may be maintained until the new reduced thrust level is reached (98).

Although examples of the disclosure are described primarily with regard to the low-pressure spool assembly of engine 18A including a motor-generator operably connected to the shaft system of the spool, it is contemplated that such an arrangement may additionally, or alternatively be employed for an intermediate pressure (IP) spool in an engine including three or more spools. For example, in the case of an engine such as engine 18A that includes an HP spool, an IP spool, and a low-pressure spool, the engine may include a motor-generator coupled to the low-pressure spool shaft, a motor generator coupled to the IP spool shaft, or both. Regardless of the particular spool, the motor-generator (s) for the IP spool and the low-pressure spool may be operated in the manner described herein.

Example of the present disclosure may allow for one or more benefits including those described above. In some examples, to achieve an increase in stall/surge margin, a generator may be "oversized" beyond normal load requirements. However, to counteract such a design modification, it is recognized that some generators/electrical machines have both continuous and transient power ratings. The transient ratings may often be double the continuous rating. Since some examples of the disclosure related to an increase in electrical load to increase torque applied by a generator may apply only during transients, examples of the disclosure may take advantage of the transient power ratings of a generator to generate significantly more power/torque than would otherwise be possible out of generator. Moreover, as aircraft become more electrified and/or hybrid electric, there may be an increase in the size of such electric machines relative to historical sizes and, therefore, they may have an increased effect on the stall/surge margin characteristics of a gas turbine engine.

As another example benefit, as noted above, engines may incorporate compressor bleed valves to manage transient periods when there is a reduction in thrust and there is a deviation from the working line. However, such bleed valves may be very inefficient. Some examples of the disclosure may allow for improved engine efficiency by not having to use such bleed valves as often. In addition, with reference to FIG. 6, when the LP generator is operational (the Yes path off decision block 82), such an example technique might not use the bleed valves in such manner. Conversely, when the LP generator is not operational (the No path off block 82), the bleed valves may be activated. Additionally, or alternatively, some examples of the disclosure may allow a reduction in the size of the bleed valves which can reduce engine size/weight. Also, some examples of the disclosure may enable reduction or elimination of variable inlet guide vanes or stator vanes on the IP compressor which can reduce engine complexity and save size/weight. In some examples, such bleed valves may be eliminated entirely from an engine.

Various examples have been described. These and other examples are within the scope of the following clauses and claims.

Clause 1A. A system comprising a gas turbine engine, the gas turbine engine comprising: a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; a generator coupled to the second shaft, wherein the generator is configured to generate electrical power from a rotation of the second shaft, and increase the electrical power generated by the generator to increase a torque applied to the second shaft by the generator in combination with a reduction in engine thrust.

Clause 2A. The system of clause 1A, wherein the increase in torque applied to the second shaft is configured to increase a rate at which a rotational speed of the second shaft decreases during the reduction in the engine thrust.

Clause 3A. The system of clause 1A, wherein the increase in torque applied to the second shaft is configured to reduce a time period over which a rotational speed of the second shaft decreases during the reduction in engine thrust.

Clause 4A. The system of clause 1A, wherein the increase in torque applied to the second shaft is configured to decrease a transient deviation of the second compressor from a working line of the second compressor during the reduction in engine thrust.

Clause 5A. The system of any one of clauses 1A-4A, wherein the increase in torque applied to the second shaft is configured to prevent stall or surge of the second compressor due to the HP compressor decelerating faster than the second compressor.

Clause 6A. The system of clause 1A, further comprising a combustor, wherein the system is configured to reduce the engine thrust by at least reducing a fuel supplied to the combustor, and wherein the system is configured to increase the electrical power generated by the generator to increase the torque applied to the second shaft such that the torque on the second shaft is increased at substantially the same time as the reduction in the engine thrust.

Clause 7A. The system of clause 1A, wherein the system is configured to reduce the engine thrust at a first rate when in combination with the increase in the torque applied by the generator to the second shaft to increase a rate at which a rotational speed of the second shaft is reduced, and wherein the system is configured to: determine that the generator has failed, and reduce the thrust generated by the engine at a second rate less than the first rate based on the determination that the generator has failed.

Clause 8A. The system of clause 7A, wherein the system is configured to reduce the thrust generated by the engine at the second rate by reducing a rate of change at which the fuel is supplied to the combustor.

Clause 9A. The system of any one of clauses 1A-8A, wherein the second compressor comprises a low-pressure compressor.

Clause 10A. The system of any one of clauses 1A-9A, wherein the second compressor comprises an intermediate pressure compressor, the gas turbine engine further comprising a fan.

Clause 11A. The system of any one of clause 1A-10A, further comprising an energy storage device, wherein the increased power generated by the generator is stored in the energy storage device.

Clause 12A. The system of clause 11A, wherein the energy storage device comprises a battery.

Clause 13A. The system of any one of clauses 1A-12A, wherein the electrical power generated by the generator is increased in combination with the reduction in engine thrust by at least increasing an electrical load applied on the generator, and wherein the increase load applied on the generator increases the torque applied on the second shaft by the generator in combination with the reduction in engine thrust.

Clause 14A. The system of any one of clauses 1A-13A, wherein the electrical load applied on the generator is increased by at least changing a source of electrical power extraction by electrical systems from at least one of an energy storage device or another generator to the generator.

Clause 15A. The system of any one of clauses 1A-14A, wherein the electrical load applied on the generator is increased by at least one of increasing an electrical load to an energy storage device to the generator or increasing the electrical load applied by the electrical systems to the generator.

Clause 16A. The system of any one of clauses 1A-15A, wherein the generator comprises a first generator, the system comprising a second generator coupled to the HP shaft to generate power from a rotation of the HP shaft, wherein the first generator increases the torque applied on the second shaft by at least changing the source of electrical power to electrical systems and/or an energy storage device from the second generator to the first generator.

Clause 17A. The system of clause 16A, wherein the source of electrical power to an electrical system and/or the energy storage device is changed from the second generator to the first generator by at least increasing an electrical load applied to the first generator by the electrical system and/or the energy storage device and decreasing an electrical load applied to the second generator by the electrical system or the energy storage device.

Clause 18A. The system of clause 17A, wherein the increased electrical load applied to the first generator by the electrical system and/or the energy storage device is approximately equal to the decreased applied to the second generator by the electrical system and/or the energy storage device.

Clause 19A. A method for operating a system including a gas turbine engine, the gas turbine engine comprising a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; and a generator coupled to the second shaft, the method comprising: generating, using the generator, electrical power from a rotation of the second shaft, and increasing the electrical power generated by the generator to increase a torque applied to the second shaft by the generator in combination with a reduction in engine thrust.

Clause 20A. The method of clause 19A, wherein the increase in torque applied to the second shaft is configured to increase a rate at which a rotational speed of the second shaft decreases during the reduction in the engine thrust.

Clause 21A. The method of clause 19A, wherein the increase in torque applied to the second shaft is configured to reduce a time period over which a rotational speed of the second shaft decreases during the reduction in engine thrust.

Clause 22A. The method of clause 19A, wherein the increase in torque applied to the second shaft is configured to decrease a transient deviation of the second compressor from a working line of the second compressor during the reduction in engine thrust.

Clause 23A. The method of any one of clauses 19A-22A, wherein the increase in torque applied to the second shaft is configured to prevent stall or surge of the second compressor due to the HP compressor decelerating faster than the second compressor.

Clause 24A. The method of clause 19A, further comprising reducing the engine thrust by at least reducing a fuel supplied to the combustor, and wherein increasing the electrical power generated by the generator to increase the torque applied to the second shaft comprises increasing the electrical power generated such that the torque on the second shaft is increased at substantially the same time as the reduction in the engine thrust.

Clause 25A. The method of clause 19A, wherein the system is configured to reduce the engine thrust at a first rate when in combination with the increase in the torque applied by the generator to the second shaft to increase a rate at which a rotational speed of the second shaft is reduced, the method further comprising: determining that the generator has failed, and reducing the thrust generated by the engine at a second rate less than the first rate based on the determination that the generator has failed.

Clause 26A. The method of clause 25A, further comprising reducing the thrust generated by the engine at the second rate by reducing a rate of change at which the fuel is supplied to the combustor.

Clause 27A. The method of any one of clauses 19A-26A, wherein the second compressor comprises a low-pressure compressor.

Clause 28A. The method of any one of clauses 19A-27A, wherein the second compressor comprises an intermediate pressure compressor, the gas turbine engine further comprising a fan.

Clause 29A. The method of any one of clause 19A-28A, wherein the system includes an energy storage device, wherein the increased power generated by the generator is stored in the energy storage device.

Clause 30A. The method of clause 29A, wherein the energy storage device comprises a battery.

Clause 31A. The method of any one of clauses 19A-30A, wherein increasing the electrical power generated by the generator to increase a torque applied to the second shaft by the generator includes increasing an electrical load applied on the generator, and wherein the increased load applied on the generator increases the torque applied on the second shaft by the generator in combination with the reduction in engine thrust.

Clause 32A. The method of any one of clauses 19A-31A, wherein increasing the electrical power generated by the generator to increase a torque applied to the second shaft by the generator includes changing a source of electrical power extraction by electrical systems from at least one of an energy storage device or another generator to the generator.

Clause 33A. The method of any one of clauses 19A-32A, increasing the electrical power generated by the generator to increase a torque applied to the second shaft by the generator includes at least one of increasing an electrical load to an energy storage device to the generator or increasing the electrical load applied by the electrical systems to the generator.

Clause 34A. The method of any one of clauses 19A-33A, wherein the generator comprises a first generator, the system comprising a second generator coupled to the HP shaft to generate power from a rotation of the HP shaft, wherein increasing the electrical power generated by the generator to increase a torque applied to the second shaft by the generator includes increasing the torque applied on the second shaft by at least changing the source of electrical power to electrical systems and/or an energy storage device from the second generator to the first generator.

Clause 35A. The method of clause 34A, wherein the source of electrical power to an electrical system and/or the energy storage device is changed from the second generator to the first generator by at least increasing an electrical load applied to the first generator by the electrical system and/or the energy storage device and decreasing an electrical load applied to the second generator by the electrical system or the energy storage device.

Clause 36A. The method of clause 35A, wherein the increased electrical load applied to the first generator by the electrical system and/or the energy storage device is approximately equal to the decreased applied to the second generator by the electrical system and/or the energy storage device.

Clause 37A. A system comprising a gas turbine engine, the gas turbine engine comprising: a high-pressure (HP) shaft; a HP compressor; a HP turbine, the HP turbine coupled to the HP compressor via the HP shaft; a fan; a second shaft; a second turbine, the second turbine being coupled to the fan via the second shaft; a generator coupled to the second shaft, wherein the generator is configured to generate electrical power from a rotation of the second shaft, and increase the electrical power generated by the generator to increase a torque applied to the second shaft by the generator in combination with a reduction in engine thrust.

Clause 38A. The system of clause 37A, according to any one of clauses 2A-18A but with the second compressor being the fan of clause 37A.

Clause 1B. A system comprising a gas turbine engine, the gas turbine engine comprising: a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; a generator coupled to the second shaft, wherein the generator is configured to generate electrical power from a rotation of the second shaft, and wherein the generator is configured to, in response to at least one of a stall or a surge of the gas turbine engine, increase the electrical power generated by the generator to increase a torque applied to the second shaft by the generator during the at least one of the stall or the surge of the gas turbine engine.

Clause 2B. The system of clause 1B, wherein the increase in torque applied to the second shaft is configured to increase a rate at which a rotational speed of the second shaft decreases during the at least one of the stall or the surge of the gas turbine engine.

Clause 3B. The system of clause 1B, wherein the increase in torque applied to the second shaft is configured to reduce a time period over which a rotational speed of the second shaft decreases during the at least one of the stall or the surge of the gas turbine engine.

Clause 4B. The system of clause 1B, wherein the increase in torque applied to the second shaft is configured to decrease a transient deviation of the second compressor from a working line of the second compressor during the at least one of the stall or the surge of the gas turbine engine.

Clause 5B. The system of any one of clauses 1B-4B, wherein the increase is torque is applied to improve recovery from the at least one of the stall or the surge.

Clause 6B. The system of any one of clauses 1B-5B, wherein the second compressor comprises a low-pressure compressor.

Clause 7B. The system of any one of clauses 1B-6B, wherein the second compressor comprises an intermediate pressure compressor, the gas turbine engine further comprising a fan.

Clause 8B. The system of any one of clause 1B-7B, further comprising an energy storage device, wherein the increased power generated by the generator is stored in the energy storage device.

Clause 9B. The system of clause 8B, wherein the energy storage device comprises a battery.

Clause 10B. The system of any one of clauses 1B-9B, wherein the electrical power generated by the generator is increased in response to the at least one of the stall or the surge by at least increasing an electrical load applied on the generator, and wherein the increase load applied on the generator increases the torque applied on the second shaft by the generator in response to the at least one of the stall or the surge.

Clause 11B. The system of any one of clauses 1B-10B, wherein the electrical load applied on the generator is increased by at least changing a source of electrical power extraction by electrical systems from at least one of an energy storage device or another generator to the generator.

Clause 12B. The system of any one of clauses 1B-11B, wherein the electrical load applied on the generator is increased by at least one of increasing an electrical load to an energy storage device to the generator or increasing the electrical load applied by the electrical systems to the generator.

Clause 13B. The system of any one of clauses 1B-12, wherein the generator comprises a first generator, the system comprising a second generator coupled to the HP shaft to generate power from a rotation of the HP shaft, wherein the first generator increases the torque applied on the second shaft by at least changing the source of electrical power to electrical systems and/or an energy storage device from the second generator to the first generator.

Clause 14B. The system of clause 13B, wherein the source of electrical power to an electrical system and/or the energy storage device is changed from the second generator to the first generator by at least increasing an electrical load applied to the first generator by the electrical system and/or the energy storage device and decreasing an electrical load applied to the second generator by the electrical system or the energy storage device.

Clause 15B. The system of clause 14B, wherein the increased electrical load applied to the first generator by the electrical system and/or the energy storage device is approximately equal to the decreased applied to the second generator by the electrical system and/or the energy storage device.

Clause 16B. A method for operating a system including a gas turbine engine, the gas turbine engine comprising a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; and a generator coupled to the second shaft, the method comprising: generating, using the generator, electrical power from a rotation of the second shaft; detecting at least one of a stall or a surge of the gas turbine engine; and increasing, in response to the detected at least one of the stall or the surge of the gas turbine engine, the electrical power generated by the generator to increase a torque applied to the second shaft by the generator during the at least one of the stall or the surge of the gas turbine engine.

Clause 17B. The method of clause 16B, wherein the increase in torque applied to the second shaft is configured to increase a rate at which a rotational speed of the second shaft decreases during the at least one of the stall or the surge of the gas turbine engine.

Clause 18B. The method of clause 16B, wherein the increase in torque applied to the second shaft is configured to reduce a time period over which a rotational speed of the second shaft decreases during the at least one of the stall or the surge of the gas turbine engine.

Clause 19B. The method of clause 16B, wherein the increase in torque applied to the second shaft is configured to decrease a transient deviation of the second compressor from a working line of the second compressor during the at least one of the stall or the surge of the gas turbine engine.

Clause 20B. The method of any one of clauses 16B-19B, wherein the increase is torque is applied to improve recovery from the at least one of the stall or the surge.

Clause 21B. The method of any one of clauses 16B-20B, wherein the second compressor comprises a low-pressure compressor.

Clause 22B. The method of any one of clauses 16B-24B, wherein the second compressor comprises an intermediate pressure compressor, the gas turbine engine further comprising a fan.

Clause 23B. The method of any one of clause 16B-22B, the system comprising an energy storage device, wherein the increased power generated by the generator is stored in the energy storage device.

Clause 24B. The method of clause 23B, wherein the energy storage device comprises a battery.

Clause 25B. The method of any one of clauses 16B-24B, wherein increasing the electrical power generated by the generator to increase a torque applied to the second shaft comprises increasing an electrical load applied on the generator, and wherein the increase load applied on the generator increases the torque applied on the second shaft by the generator in response to the at least one of the stall or the surge.

Clause 26B. The method of any one of clauses 16B-25B, wherein increasing the electrical load applied on the generator increased includes changing a source of electrical power extraction by electrical systems from at least one of an energy storage device or another generator to the generator.

Clause 27B. The method of any one of clauses 16B-26B, wherein increasing the electrical load applied on the generator increased includes at least one of increasing an electrical load to an energy storage device to the generator or increasing the electrical load applied by the electrical systems to the generator.

Clause 28B. The method of any one of clauses 16B-27B, wherein the generator comprises a first generator, the system comprising a second generator coupled to the HP shaft to generate power from a rotation of the HP shaft, wherein the first generator increases the torque applied on the second shaft by at least changing the source of electrical power to electrical systems and/or an energy storage device from the second generator to the first generator.

Clause 29B. The method of clause 28B, wherein the source of electrical power to an electrical system and/or the energy storage device is changed from the second generator to the first generator by at least increasing an electrical load applied to the first generator by the electrical system and/or the energy storage device and decreasing an electrical load applied to the second generator by the electrical system or the energy storage device.

Clause 30B. The method of clause 29B, wherein the increased electrical load applied to the first generator by the electrical system and/or the energy storage device is approximately equal to the decreased applied to the second generator by the electrical system and/or the energy storage device.

What is claimed is:

1. A system comprising a gas turbine engine, the gas turbine engine comprising:
   a high-pressure (HP) shaft;
   a HP compressor;
   a HP turbine, the HP turbine coupled to the HP compressor via the HP shaft;
   a second shaft;
   a second compressor;
   a second turbine, the second turbine being coupled to the second compressor via the second shaft;
   a generator coupled to the second shaft, wherein the generator is configured to generate electrical power from a rotation of the second shaft; and
   a controller, wherein the controller is configured to detect an occurrence of at least one of a stall or a surge of the gas turbine engine, and
   wherein the controller is configured to, in response to the at least one of the stall or the surge of the gas turbine engine, control the generator to increase the electrical power generated by the generator to increase a torque applied to the second shaft by the generator during the at least one of the stall or the surge of the gas turbine engine, wherein the torque applied to the second shaft opposes rotation of the second shaft and reduces a rotational speed of the second shaft during the stall or the surge of the gas turbine engine, and wherein all of the increased electrical power generated by the generator in response to the at least one of the stall or the surge is directed external to the gas turbine engine.

2. The system of claim 1, wherein the increase in the torque applied to the second shaft is configured to increase a rate at which a rotational speed of the second shaft decreases during the at least one of the stall or the surge of the gas turbine engine.

3. The system of claim 1, wherein the increase in the torque applied to the second shaft is configured to reduce a time period over which a rotational speed of the second shaft decreases during the at least one of the stall or the surge of the gas turbine engine.

4. The system of claim 1, wherein the increase in the torque applied to the second shaft is configured to decrease a transient deviation of the second compressor from a working line of the second compressor during the at least one of the stall or the surge of the gas turbine engine.

5. The system of claim 1, wherein the increase in the torque is applied to improve recovery from the at least one of the stall or the surge.

6. The system of claim 1, wherein the second compressor comprises a low-pressure compressor.

7. The system of claim 1, wherein the second compressor comprises an intermediate pressure compressor, the gas turbine engine further comprising a fan.

8. The system of claim 1, further comprising an energy storage device, wherein at least a portion of the increased electrical power generated by the generator that is directed external to the gas turbine engine is stored in the energy storage device.

9. The system of claim 8, wherein the energy storage device comprises a battery.

10. The system of claim 1, wherein the electrical power generated by the generator is increased in response to the at least one of the stall or the surge by at least increasing an electrical load applied on the generator, and wherein the increased load applied on the generator increases the torque applied on the second shaft by the generator in response to the at least one of the stall or the surge.

11. The system of claim 10, wherein the electrical load applied on the generator is increased by at least changing a source of electrical power extraction by an electrical system from at least one of an energy storage device or another generator to the generator.

12. The system of claim 10, wherein the electrical load applied on the generator is increased by at least one of increasing an electrical load to an energy storage device to the generator or increasing the electrical load applied by an electrical system to the generator.

13. The system of claim 1, wherein the generator comprises a first generator, the system comprising a second generator coupled to the HP shaft to generate power from a rotation of the HP shaft, wherein the first generator increases the torque applied on the second shaft by at least changing the source of electrical power to an electrical system and/or an energy storage device from the second generator to the first generator, and wherein the second generator generates power during the at least one of the stall or the surge of the gas turbine engine.

14. The system of claim 13, wherein the source of electrical power to the electrical system and/or the energy storage device is changed from the second generator to the first generator by at least increasing an electrical load applied to the first generator by the electrical system and/or the energy storage device and decreasing an electrical load applied to the second generator by the electrical system or the energy storage device.

15. The system of claim 14, wherein the increased electrical load applied to the first generator by the electrical system and/or the energy storage device is approximately equal to the decreased electrical load applied to the second generator by the electrical system and/or the energy storage device.

16. The system of claim 1, wherein the controller is configured to, in response to the stall of the gas turbine engine, control the generator to increase the electrical power generated by the generator to increase the torque applied to the second shaft by the generator during the stall of the gas turbine engine.

17. A method for operating a system including a gas turbine engine, the gas turbine engine comprising a high-pressure (HP) shaft; a HP compressor; a HP turbine, the HP turbine coupled to the HP compressor via the HP shaft; a second shaft; a second compressor; a second turbine, the second turbine being coupled to the second compressor via the second shaft; and a generator coupled to the second shaft, the method comprising:
  generating, using the generator, electrical power from a rotation of the second shaft;
  detecting at least one of a stall or a surge of the gas turbine engine; and
  increasing, in response to the detected at least one of the stall or the surge of the gas turbine engine, the electrical power generated by the generator to increase a torque applied to the second shaft by the generator during the at least one of the stall or the surge of the gas turbine engine, wherein the torque applied to the second shaft opposes rotation of the second shaft and reduces a rotational speed of the second shaft during the stall or the surge of the gas turbine engine, and wherein all of the increased electrical power generated by the generator in response to the at least one of the stall or the surge is directed external to the gas turbine engine.

18. The method of claim 17, wherein the increase in the torque applied to the second shaft is configured to increase a rate at which a rotational speed of the second shaft decreases during the at least one of the stall or the surge of the gas turbine engine.

19. The method of claim 17, wherein the increase in the torque applied to the second shaft is configured to reduce a time period over which a rotational speed of the second shaft decreases during the at least one of the stall or the surge of the gas turbine engine.

20. The method of claim 17, wherein the increase in the torque applied to the second shaft is configured to decrease a transient deviation of the second compressor from a working line of the second compressor during the at least one of the stall or the surge of the gas turbine engine.

* * * * *